(12) United States Patent
Suzuki

(10) Patent No.: US 11,981,138 B2
(45) Date of Patent: May 14, 2024

(54) INFORMATION PROCESSING SYSTEM, LEARNING DEVICE, AND INFORMATION PROCESSING METHOD

(71) Applicant: SEIKO EPSON CORPORATION, Tokyo (JP)

(72) Inventor: Kazunaga Suzuki, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 86 days.

(21) Appl. No.: 17/447,502

(22) Filed: Sep. 13, 2021

(65) Prior Publication Data

US 2022/0080726 A1 Mar. 17, 2022

(30) Foreign Application Priority Data

Sep. 16, 2020 (JP) .................. 2020-155297

(51) Int. Cl.
*B41J 2/165* (2006.01)
*B41J 2/045* (2006.01)
*G06N 20/00* (2019.01)

(52) U.S. Cl.
CPC ........... *B41J 2/165* (2013.01); *B41J 2/04541* (2013.01); *B41J 2/04573* (2013.01); *B41J 2/16579* (2013.01); *G06N 20/00* (2019.01); *B41J 2/04563* (2013.01); *B41J 2/04566* (2013.01); *B41J 2002/16573* (2013.01); *B41J 2002/16582* (2013.01)

(58) Field of Classification Search
CPC ............................ B41J 2/16579; B41J 2/0451
See application file for complete search history.

(56) References Cited

U.S. PATENT DOCUMENTS

| 7,246,870 | B2 * | 7/2007 | Takano | B41J 29/393 347/19 |
| 8,356,879 | B1 * | 1/2013 | Tallada | B41J 2/16579 347/22 |
| 11,472,175 | B2 | 10/2022 | Katayama et al. | |
| 2017/0021631 | A1 * | 1/2017 | Ono | B41J 2/16579 |
| 2018/0214901 | A1 * | 8/2018 | Nelson | B08B 13/00 |
| 2018/0345703 | A1 * | 12/2018 | Osadchyy | B41J 29/393 |
| 2020/0247127 | A1 * | 8/2020 | Sakamoto | B41J 2/16579 |
| 2021/0178424 | A1 * | 6/2021 | Saku | B41J 2/16517 |

FOREIGN PATENT DOCUMENTS

| CN | 1618606 | 5/2005 |
| CN | 111660687 | 9/2020 |
| JP | 2010-058306 A | 3/2010 |

* cited by examiner

*Primary Examiner* — Shelby L Fidler
(74) *Attorney, Agent, or Firm* — WORKMAN NYDEGGER

(57) ABSTRACT

An information processing system includes a storage portion that stores a learned model obtained by performing machine learning on a maintenance condition for a print head based on a data set in which nozzle surface image information obtained by photographing a nozzle plate surface of the print head and maintenance information representing necessity of maintenance of the print head or a recommended execution timing of the maintenance are associated with each other, an acquisition portion that acquires the nozzle surface image information, and a processing portion that outputs the maintenance information based on the nozzle surface image information and the learned model at a timing before a discharge defect of the print head occurs.

13 Claims, 19 Drawing Sheets

OBSERVATION DATA

| TIME | NOZZLE SURFACE IMAGE INFORMATION | DISCHARGE DEFECT |
|---|---|---|
| $t_1$ | IM1 | — |
| $t_2$ | IM2 | — |
| ⋮ | ⋮ | ⋮ |
| $t_{i-1}$ | IMi−1 | — |
| $t_i$ | IMi | OCCUR |
|  |  |  |

TRAINING DATA

| INPUT DATA | CORRECT ANSWER LABEL |
|---|---|
| IM1 | UNNECESSARY |
| IM2 | UNNECESSARY |
| ⋮ | ⋮ |
| IMj−1 | UNNECESSARY |
| IMj | NECESSARY |
| ⋮ | ⋮ |
| IMi | NECESSARY |

OBSERVATION DATA

| TIME | NOZZLE SURFACE IMAGE INFORMATION | DISCHARGE DEFECT INFLUENCE INFORMATION | DISCHARGE DEFECT |
|---|---|---|---|
| $t_1$ | IM1 | e1 | — |
| $t_2$ | IM2 | e2 | — |
| ⋮ | ⋮ | ⋮ | ⋮ |
| $t_{i-1}$ | IMi-1 | ei-1 | — |
| $t_i$ | IMi | ei | OCCUR |
|  |  |  |  |

TRAINING DATA

| INPUT DATA | CORRECT ANSWER LABEL |
|---|---|
| (IM1, e1) | $t_i - t_1 - T$ |
| (IM2, e2) | $t_i - t_2 - T$ |
| ⋮ | ⋮ |
| (IMi-1, ei-1) | $t_i - t_{i-1} - T$ |

INFORMATION PROCESSING SYSTEM, LEARNING DEVICE, AND INFORMATION PROCESSING METHOD

The present application is based on, and claims priority from JP Application Serial Number 2020-155297, filed Sep. 16, 2020, the disclosure of which is hereby incorporated by reference herein in its entirety.

BACKGROUND

1. Technical Field

The present disclosure relates to an information processing system, a learning device, and an information processing method.

2. Related Art

In the related art, a printing device has been widely known that forms an image on a print medium by discharging ink droplets from a print head. It is known that a discharge defect occurs in the print head due to various factors. When the discharge defect occurs, ink droplets do not land at appropriate positions on the print medium, thereby resulting in deterioration of print quality. For example, when the printing device is a production machine used in the field of signing and textile printing, the occurrence of the discharge defect greatly influences the productivity.

JP-A-2010-58306 discloses a method of regularly performing maintenance of a print head at a predetermined execution timing.

As described above, when the discharge defect occurs in the print head, appropriate printing results are not obtained, so that the productivity decreases in the production machine or the like. Therefore, it is desirable to detect a sign of the discharge defect before the discharge defect occurs and to take an appropriate measure such as maintenance. However, although uniform preventive maintenance, such as timer cleaning, is disclosed in the method according to the related art as in JP-A-2010-58306, sign detection is not sufficiently disclosed. In particular, the method according to the related art does not disclose a method of using image information obtained by imaging a nozzle surface of the print head.

SUMMARY

According to an aspect of the present disclosure, there is provided an information processing system including a storage portion that stores a learned model obtained by performing machine learning on a maintenance condition for a print head based on a data set in which nozzle surface image information obtained by photographing a nozzle plate surface of the print head and maintenance information representing necessity of maintenance of the print head or a recommended execution timing of the maintenance are associated with each other; an acquisition portion that acquires the nozzle surface image information; and a processing portion that outputs the maintenance information based on the nozzle surface image information and the learned model at a timing before a discharge defect of the print head occurs.

According to another aspect of the present disclosure, there is provided a learning device including an acquisition portion that acquires a data set in which nozzle surface image information obtained by photographing a nozzle plate surface of a print head and maintenance information representing necessity of maintenance of the print head or a recommended execution timing of the maintenance are associated with each other; and a learning portion that generates a learned model by performing machine learning on a maintenance condition for the print head for executing the maintenance at a timing before a discharge defect of the print head occurs based on the data set.

According to still another aspect of the present disclosure, there is provided an information processing method including acquiring a learned model obtained by performing machine learning on a maintenance condition for a print head based on a data set in which nozzle surface image information obtained by photographing a nozzle plate surface of the print head and maintenance information representing necessity of maintenance of the print head or a recommended execution timing of the maintenance are associated with each other; acquiring the nozzle surface image information; and outputting the maintenance information based on the nozzle surface image information and the learned model at a timing before a discharge defect of the print head occurs.

DESCRIPTION OF EXEMPLARY EMBODIMENTS

Hereinafter, preferred embodiments of the present disclosure will be described in detail. The present embodiment described below does not unreasonably limit contents described in the claims, and not all of the configurations described in the present embodiment are limited as essential constituent requirements.

1. Information Processing System

Figure 1:
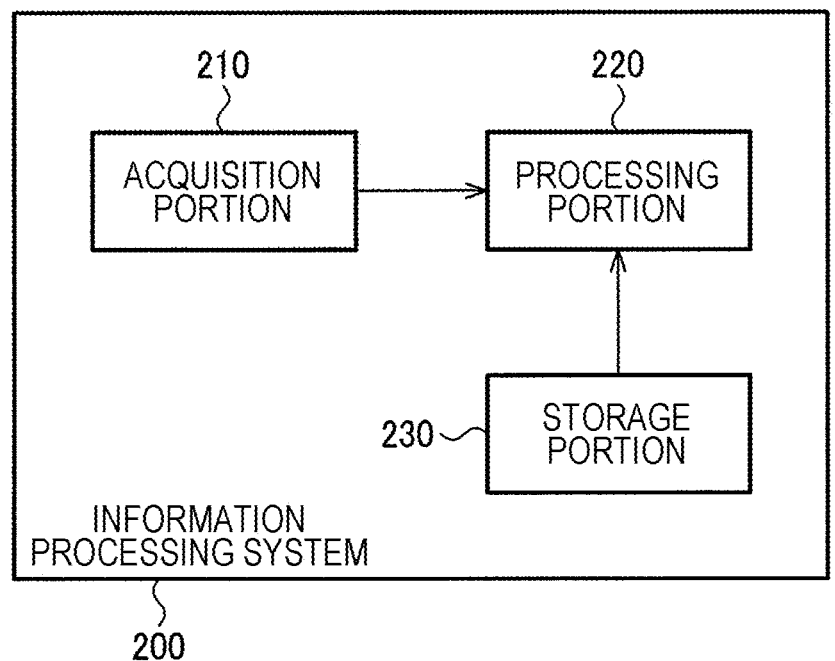
FIG. 1 is a configuration example of an information processing system.

FIG. 1 is a diagram showing a configuration example of an information processing system 200 of the present embodiment. The information processing system 200 includes an acquisition portion 210, a processing portion 220, and a storage portion 230. The storage portion 230 stores a learned model. The learned model is a model acquired by performing machine learning on maintenance conditions for a print head 30 based on a data set in which nozzle surface image information obtained by photographing a nozzle plate surface of the print head 30 and maintenance information representing necessity of maintenance of the print head 30 or a recommended execution timing of maintenance are associated with each other. For example, as will be described later, the learned model is generated by a learning device 400. The learning device 400 generates the learned model based on learning nozzle surface image information which is the nozzle surface image information acquired in a learning stage and learning maintenance information which is the maintenance information acquired in the learning stage. Details of a process in the learning device 400 will be described later. Details of a printing device 1, such as the print head 30, will be described later with reference to FIG. 2 and the like.

The acquisition portion 210 acquires the nozzle surface image information in an inference stage. The processing portion 220 performs a process of outputting the maintenance information based on the nozzle surface image information acquired by the acquisition portion 210 and the learned model read from the storage portion 230.

The information processing system 200 of the present embodiment is a system that functions as an inference device that executes an inference process based on a generated learned model. The information processing system 200 may be provided as a system different from the printing device 1 which will be described later using FIG. 2 and the like. For example, the information processing system 200 may be a computer CP in FIG. 2, or may be a server system (not shown) connected to the computer CP via a network. Alternatively, the information processing system 200 may be included in the printing device 1. For example, the printing device 1 may include a second controller that executes a process corresponding to the information processing system 200, in addition to a controller 100 that performs print control which will be described later. Alternatively, the controller 100 which will be described later may include the information processing system 200. Further, the information processing system 200 may be realized by distributed processing of a plurality of devices.

The acquisition portion 210 may be, for example, an interface for acquiring the nozzle surface image information from the printing device 1, may be a processor that controls the interface, or may be both the interface and the processor. For example, when the printing device 1 is connected to the information processing system 200 via the network, the acquisition portion 210 is a communication interface for performing communication via the network, a communication control circuit, or the like.

The processing portion 220 consists of the following hardware. The hardware can include at least one of a circuit that processes a digital signal and a circuit that processes an analog signal. For example, the hardware can consist of one or more circuit devices mounted on a circuit substrate or one or more circuit elements. The one or more circuit devices are, for example, integrated circuits (IC), field-programmable gate arrays (FPGAs), and the like. The one or more circuit elements are, for example, resistors, capacitors, and the like.

Further, the processing portion 220 may be realized by the following processor. The information processing system 200 of the present embodiment includes a memory that stores information, and a processor that operates based on the information stored in the memory. Here, the memory may be the storage portion 230 or another memory. The information includes, for example, a program and various data. The processor includes the hardware. As the processor, various processors, such as a central processing unit (CPU), a graphics processing unit (GPU), and a digital signal processor (DSP), can be used. The memory may be a semiconductor memory such as a static random access memory (SRAM) or a dynamic random access memory (DRAM), may be a register, may be a magnetic storage device such as a hard disk device, and may be an optical storage device such as an optical disk device. For example, the memory stores commands that can be read by the computer, and a function of the processing portion 220 is realized as a process when the processor executes the commands. Here, the command may be a command of a command set constituting the program, or may be a command instructing an operation with respect to a hardware circuit of the processor.

The storage portion 230 stores various types of information such as the data and the program. The processing portion 220 operates, for example, using the storage portion 230 as a work area. The storage portion 230 may be a semiconductor memory such as the SRAM or the DRAM, may be the register, may be the magnetic storage device, or may be the optical storage device. The storage portion 230 stores information of the learned model as described above.

According to a method of the present embodiment, the maintenance information is output based on the nozzle surface image information at a stage before a discharge defect actually occurs. The nozzle surface image information is information representing an image acquired by imaging the nozzle plate surface on which nozzles Nz are formed. The nozzle plate surface represents a surface on a side, to which ink droplets are discharged, of a surface of a nozzle plate NP, which is a flat member, in other words, a surface on a side facing a print medium when printing is performed.

Depending on a state of the nozzle plate surface, there is a problem in that normal flight of ink discharged from the nozzles Nz is hindered. Specifically, when foreign matters or liquid droplets adhere to the nozzle plate surface, positions or sizes of the foreign matters or the like change even when the foreign matters or the like do not hinder the ink from flying at that stage, so that there is a possibility that the discharge defect occurs. That is, the nozzle surface image information is information related to a future discharge defect. In the method of the present embodiment, the necessity of maintenance and the recommended execution timing of maintenance can be accurately estimated by using the nozzle surface image information. As a result, downtime can be reduced, so that productivity can be improved in, for example, the printing device 1 which is a production machine.

For example, the nozzle surface image information of the present embodiment is information which can specify at least one of foreign matter information related to the foreign matters on the nozzle plate surface and foreign matter information related to the liquid droplets on the nozzle plate surface.

The foreign matter information on the nozzle plate surface is information related to the foreign matters adhering to the nozzle plate surface, as will be described later with reference to FIG. 7, and is, for example, information such as floating fluff and paper dust. The fluff is fine hair generated on a surface of the print medium. Here, the print medium is, for example, a cloth. The paper dust is a small fragment of the print medium that is paper. The liquid droplets on the nozzle plate surface are ink droplets or water droplets adhering to the nozzle plate surface, as will be described later with reference to FIG. 8. The ink droplets are generated, for example, when ink mist adheres to the nozzle plate surface. The mist is mist-like ink generated when the ink is discharged from the nozzles Nz. The water droplets are generated by dew condensation. For example, when a temperature of the nozzle plate NP is relatively lower than an ambient temperature, the dew condensation occurs due to a temperature difference.

As in JP-A-2010-58306 described above, a method for performing preventive maintenance such as, timer cleaning, is known. However, when maintenance is executed at a regular timing, there is a case where the maintenance is executed even in a case of a state in which the maintenance is not always required. In this case, there is a problem in that the ink is wastefully consumed or a printing operation is stopped due to the maintenance. On the other hand, when a maintenance interval is set to be long, excessive maintenance is suppressed, but there is a problem in that the discharge defect occurs before the maintenance is executed.

On the other hand, in the method of the present embodiment, the nozzle surface image information is used. As described above, the nozzle surface image information includes information, such as the foreign matter information or the liquid droplet information, for specifying a factor of the future discharge defect. That is, in the method of the present embodiment, the necessity and timing of maintenance can be determined in consideration of a state of the print head 30 at that time. As a result, it is possible to appropriately suppress the occurrence of discharge defect and suppress the excessive maintenance.

Further, the process executed by the information processing system 200 of the present embodiment may be realized as an information processing method. The information processing method includes acquiring the learned model, acquiring the nozzle surface image information, and outputting maintenance information based on the nozzle surface image information and the learned model at the timing before the discharge defect of the print head 30 occurs. The learned model is a model acquired by performing machine learning on the maintenance conditions for the print head 30 based on the data set in which the nozzle surface image information obtained by photographing the nozzle plate surface of the print head 30 and the maintenance information representing the necessity of maintenance of the print head 30 or the recommended execution timing of maintenance are associated with each other.

2. Printing Device

Figure 2:
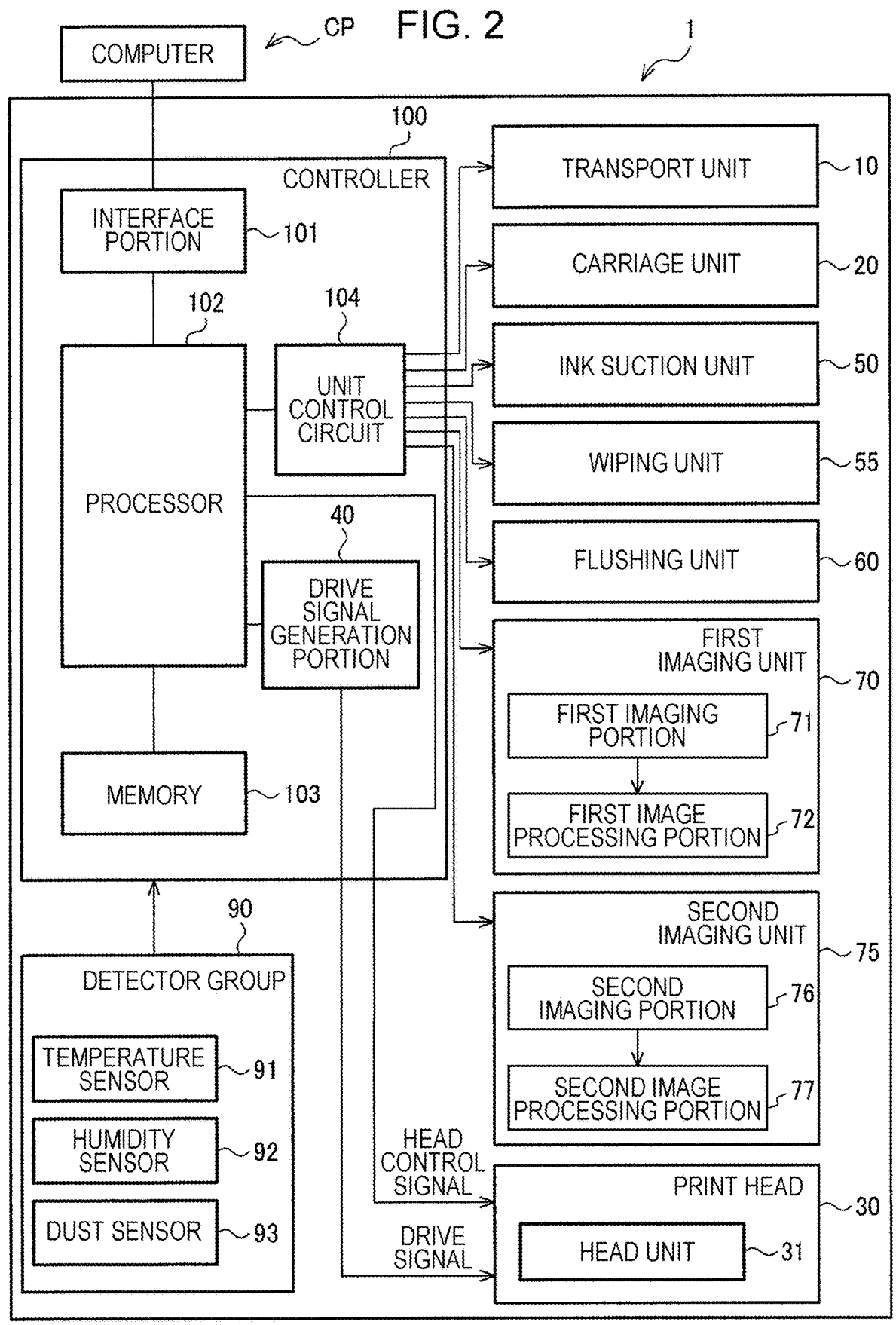
FIG. 2 is a configuration example of a printing device.

FIG. 2 is a diagram showing a configuration of the printing device 1. As shown in FIG. 2, the printing device 1 includes a transport unit 10, a carriage unit 20, a print head 30, a drive signal generation portion 40, an ink suction unit 50, a wiping unit 55, a flushing unit 60, a first imaging unit 70, a second imaging unit 75, a detector group 90, and a controller 100. The printing device 1 discharges the ink toward the print medium and is communicatively connected to the computer CP. The computer CP transmits print data corresponding to an image to the printing device 1 in order to cause the printing device 1 to print the image.

Figure 3:
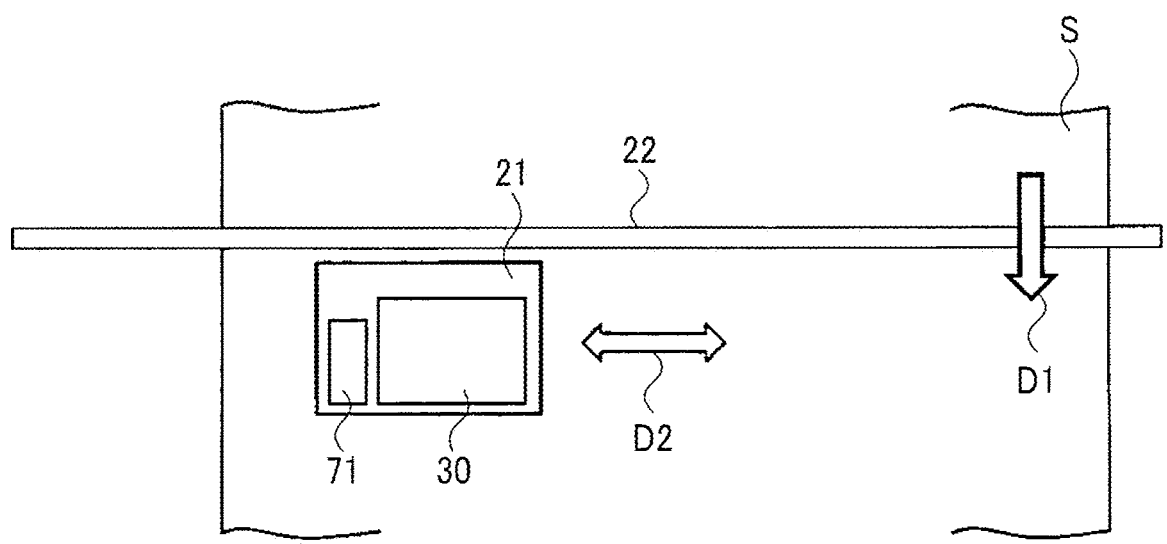
FIG. 3 is a diagram showing a configuration around a print head.

FIG. 3 is a diagram showing a configuration around the print head 30. The print medium is transported in a predetermined direction by the transport unit 10. The print medium is, for example, paper S. The paper S may be print paper of a predetermined size or may be continuous paper. The print medium is not limited to paper, and various media, such as a cloth, a film, and polyvinyl chloride (PVC), can be used. Hereinafter, the direction in which the print medium is transported is referred to as a transport direction. The transport direction corresponds to D1 in FIG. 3. The transport unit 10 includes a transport roller (not shown), a transport motor, and the like. The transport motor rotates the transport roller. The fed print medium is transported to a print area, which is an area where the printing process can be executed, through rotation of the transport roller. The print area is an area that can face the print head 30.

The print head 30 is mounted on the carriage unit 20. The carriage unit 20 includes a carriage 21 supported to be reciprocally movable along a guide rail 22 in a paper width direction of the paper S, and a carriage motor (not shown). The carriage motor is driven based on a carriage control signal from a processor 102. The carriage 21 moves integrally with the print head 30 when the carriage motor is driven. The printing device 1 of the present embodiment is, for example, a printing device using a serial head method, as shown in FIG. 3. The serial head method is a method of performing printing for a paper width by reciprocating the print head 30 in the paper width direction. The paper width direction may be represented as a main scanning direction. The paper width direction or the main scanning direction corresponds to D2 in FIG. 3.

The print head 30 includes a plurality of head units 31. Each head unit 31 includes, for example, a plurality of nozzles Nz disposed along the transport direction, and a head control portion (not shown). Hereinafter, the plurality of nozzles Nz disposed along a predetermined direction will be referred to as a nozzle row.

The drive signal generation portion 40 generates a drive signal. When the drive signal is applied to a piezo element PZT which is a drive element, the piezo element PZT expands and contracts, so that the ink is discharged from each of the nozzles Nz. Details of the head unit 31 including the piezo element PZT will be described later with reference to FIG. 4. The head control portion controls the discharge of the ink from the nozzles Nz with respect to the print medium based on a head control signal from the processor 102 and the drive signal from the drive signal generation portion 40. As a result, an image is formed on the print medium.

The ink suction unit 50 sucks the ink in the head from the nozzles Nz of the print head 30 and releases the ink to the outside of the head. The ink suction unit 50 operates a suction pump (not shown) in a state where a cap (not shown) is in close contact with a nozzle surface of the print head 30 so as to make a space of the cap be a negative pressure, thereby sucking the ink in the print head 30 together with air bubbles mixed in the print head 30.

The wiping unit 55 removes the foreign matters or the liquid droplets adhering to the nozzle plate NP of the print head 30. The wiping unit 55 includes a wiper capable of coming in contact with the nozzle plate NP of the print head 30. The wiper is an elastic member having flexibility. When the carriage motor is driven and the carriage 21 moves in the paper width direction, a tip portion of the wiper comes in contact with the nozzle plate NP of the print head 30 and is bent. As a result, the wiping unit 55 removes the foreign matters or the liquid droplets adhering to the nozzle plate NP. Alternatively, the wiping unit 55 may include a mopping member, such as a cloth, and a first winding shaft and a second winding shaft around which the mopping member is wound. The mopping member wound around the first winding shaft is fed to the second winding shaft by a given feeding unit. When the mopping member is pressed against the nozzle plate NP on a path, the foreign matters or the liquid droplets adhering to the nozzle plate NP are removed.

The flushing unit 60 receives and stores the ink discharged when the print head 30 performs a flushing operation. The flushing operation is an operation of applying a drive signal, which is not related to an image to be printed, to the drive element, and causing the ink droplets to be forcibly and continuously discharged from the nozzles Nz.

The first imaging unit 70 inspects the discharge defect based on a state of a printed image formed on the paper S. The first imaging unit 70 includes a first imaging portion 71 having a lens and an imaging element, and a first image processing portion 72 that performs a process with respect to an output signal of the imaging element. For example, the first imaging unit 70 acquires discharge result information by imaging a result in which the ink is discharged to the print medium. Although the first image processing portion 72 and the controller 100 are shown, respectively, in FIG. 2, the first image processing portion 72 may be realized by the controller 100. The first imaging portion 71 is mounted, for example, on the carriage 21, as shown in FIG. 3.

The second imaging unit 75 inspects the state of the nozzle plate surface of the print head 30. The second imaging unit 75 includes a second imaging portion 76 having a lens and an imaging element, and a second image processing portion 77 that performs a process with respect to an output signal of the imaging element. For example, the second imaging portion 76 is fixed at a given position of the printing device 1. For example, the second imaging portion 76 is disposed at a position and an angle so as to face the nozzle plate NP of the print head 30 in a state where the carriage 21 is moved to a given position which does not face the print medium. The second image processing portion 77 may be provided separately from the controller 100, or may be realized by the controller 100.

The controller 100 is a control unit for controlling the printing device 1. The controller 100 includes an interface portion 101, the processor 102, a memory 103, and a unit control circuit 104. The interface portion 101 transmits and receives data between the computer CP, which is an external device, and the printing device 1. The processor 102 is an arithmetic processing unit for controlling the whole printing device 1. The processor 102 is, for example, the CPU. The memory 103 is used to secure an area, which stores the program of the processor 102, a work area, and the like. The processor 102 controls each unit using the unit control circuit 104 according to the program stored in the memory 103.

The detector group 90 monitors an operating situation of the printing device 1, and includes, for example, a temperature sensor 91, a humidity sensor 92, and a dust sensor 93. The dust sensor 93 is, for example, a particle counter that counts the number of particles in the space. The detector group 90 may include sensors (not shown) such as a barometric pressure sensor, an altitude sensor, and a rubbing sensor. The detector group 90 may include a rotary type encoder that is used to control transport of the print media, a paper detection sensor that detects presence or absence of the print medium to be transported, and a linear type encoder for detecting a position of the carriage 21 in a movement direction.

Hereinabove, the printing device 1 using the serial head method is described above. However, the printing device 1 of the present embodiment may be a printing device using a line head method in which the print head 30 is provided to cover the paper width.

Figure 4:
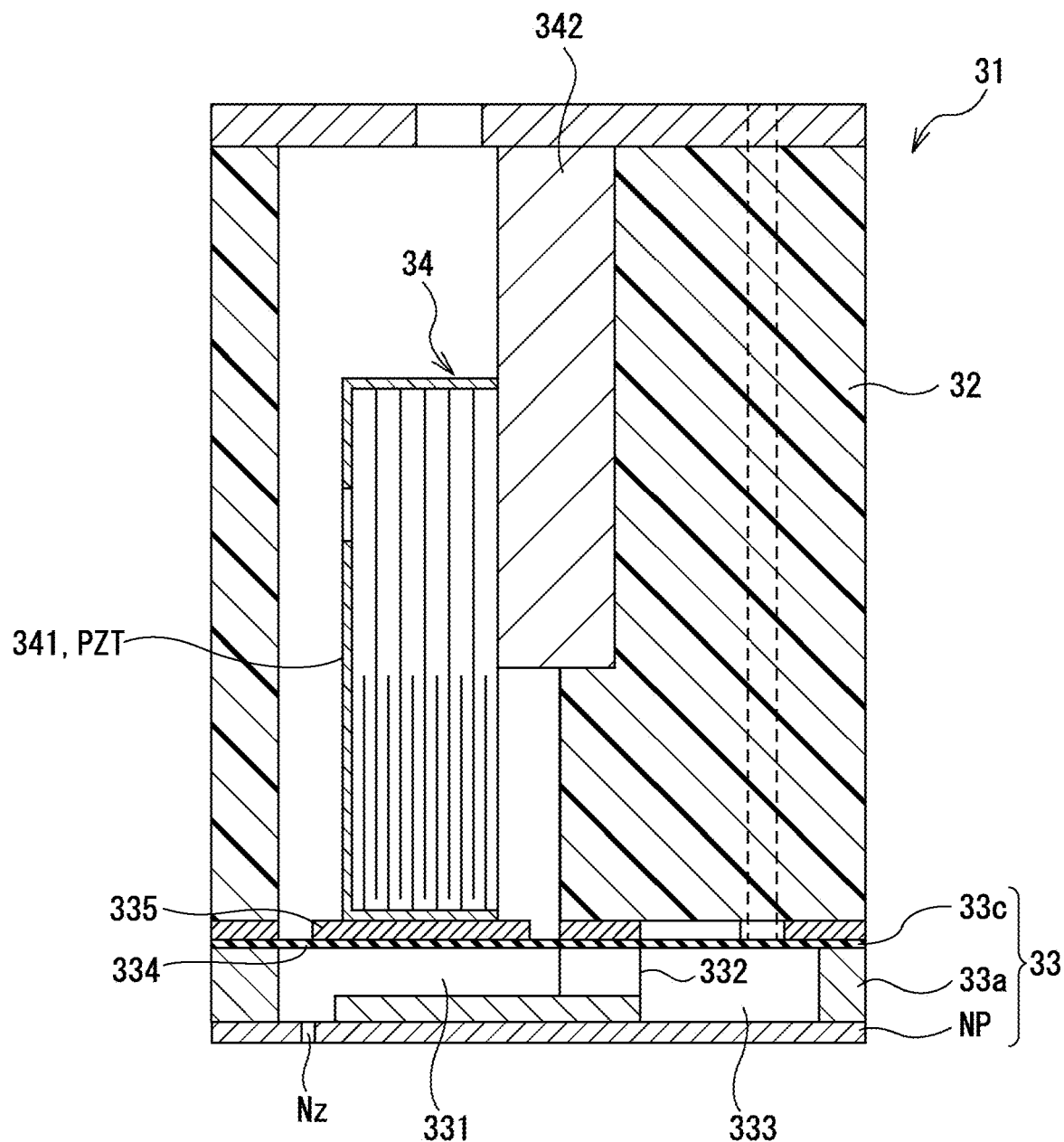
FIG. 4 is a cross-sectional diagram showing a configuration of a head unit.

FIG. 4 is a cross-sectional diagram showing a configuration of the head unit 31 included in the print head 30. The head unit 31 includes a case 32, a flow path unit 33, and a piezo element unit 34. In FIG. 4, a wiring or the like for driving the piezo element PZT is omitted.

The case 32 is a member for accommodating and fixing the piezo element PZT or the like, and is made of a non-conductive resin material such as an epoxy resin.

The flow path unit 33 includes a flow path forming substrate 33a, the nozzle plate NP, and a vibration plate 33c. The nozzle plate NP is bonded to one surface of the flow path forming substrate 33a, and the vibration plate 33c is bonded to the other surface thereof. The flow path forming substrate 33a is formed with an empty portion, which includes a pressure chamber 331, an ink supply path 332, and a common ink chamber 333, and a groove. The flow path forming substrate 33a is made of, for example, a silicon substrate. The nozzle plate NP is provided with one or more nozzle rows consisting of the plurality of nozzles Nz. The nozzle plate NP is made of a conductive plate-shaped member, for example, a thin metal plate. A diaphragm portion 334 is provided at a part, which corresponds to each pressure chamber 331, of the vibration plate 33c. The diaphragm portion 334 is deformed by the piezo element PZT to change a volume of the pressure chamber 331. The piezo element PZT and the nozzle plate NP are in an electrically insulated state by interposing the vibration plate 33c, an adhesive layer, and the like therebetween.

The piezo element unit 34 includes a piezo element group 341 and a fixing member 342. The piezo element group 341 has a comb teeth-like shape. Each comb teeth is the piezo element PZT. A tip surface of each piezo element PZT adheres to an island portion 335 of the relevant diaphragm portion 334. The fixing member 342 supports the piezo element group 341 and serves as an attachment portion with respect to the case 32. The piezo element PZT is an example of an electromechanical conversion element, and, when the drive signal is applied, the piezo element PZT expands and contracts in a longitudinal direction, thereby causing a change in pressure of liquid in the pressure chamber 331. In the ink in the pressure chamber 331, the change in pressure occurs due to a change in the volume of the pressure chamber 331. The ink droplets can be discharged from the nozzles Nz by using the change in pressure. Instead of the piezo element PZT as the electromechanical conversion element, a structure may be used in which the ink droplets are discharged by generating air bubbles according to the drive signal to be applied.

Figure 5:
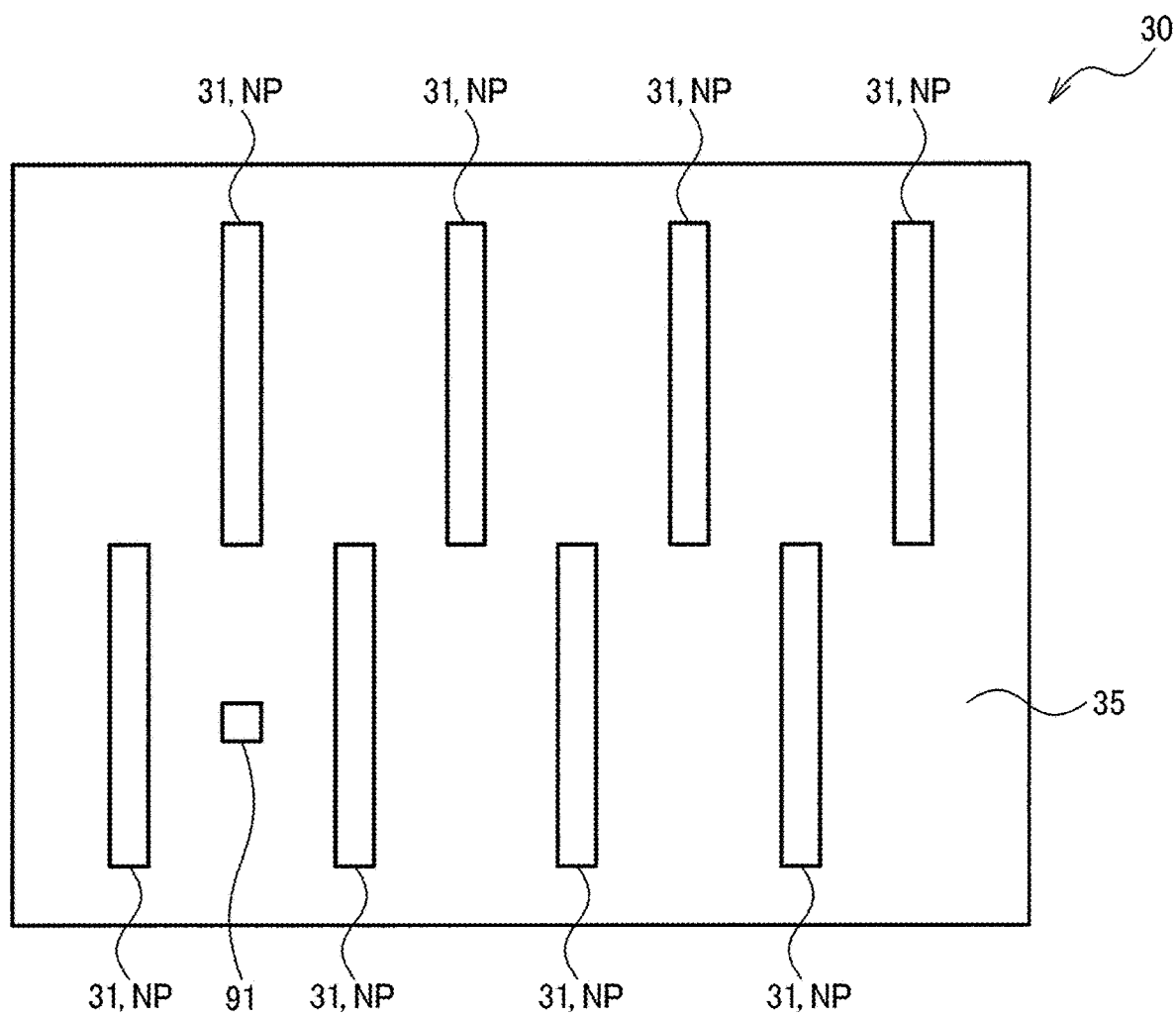
FIG. 5 is a diagram showing an example of disposition of the head unit in the print head.

FIG. 5 is a diagram showing a configuration of a surface of the print head 30 on a side from which the ink is discharged. As shown in FIG. 5, the print head 30 includes a fixing plate 35 and the plurality of head units 31 fixed to the fixing plate 35. As shown in FIG. 5, the nozzle plate NP of the head unit 31 is exposed on the surface from which the ink is discharged. As shown in FIG. 5, the temperature sensor 91 may be provided in, for example, the print head 30. In an example of FIG. 5, the temperature sensor 91 is disposed on the fixing plate 35. However, the temperature sensor 91 may be provided at another position of the printing device 1.

One head unit 31 includes, for example, one nozzle row provided along the transport direction. The print head 30 shown in FIG. 5 includes eight head units 31, that is, includes, for example, two black ink nozzle rows, two cyan ink nozzle rows, two magenta ink nozzle rows, and two yellow ink nozzle rows on a lower surface thereof. Further, the print head 30 discharges ink of a relevant color from each nozzle row toward the paper S. However, one head unit 31 may include two or more nozzle rows. In addition, the number of head units included in the print head 30 is not limited to eight, and various modifications can be performed. In addition, the print head 30 of the present embodiment may include a nozzle row having only a specific ink color.

Further, in FIG. 3, an example in which one print head 30 is provided in the carriage 21 is described. However, two or more print heads 30 may be provided in the carriage 21. For example, when the plurality of print heads 30 are disposed at different positions in the transport direction, it is possible to increase an area which can be printed while reciprocating the carriage 21 once. In addition, various configurations are known for the print head 30 and the head unit 31, and the configurations can be widely applied in the present embodiment.

Figure 6:
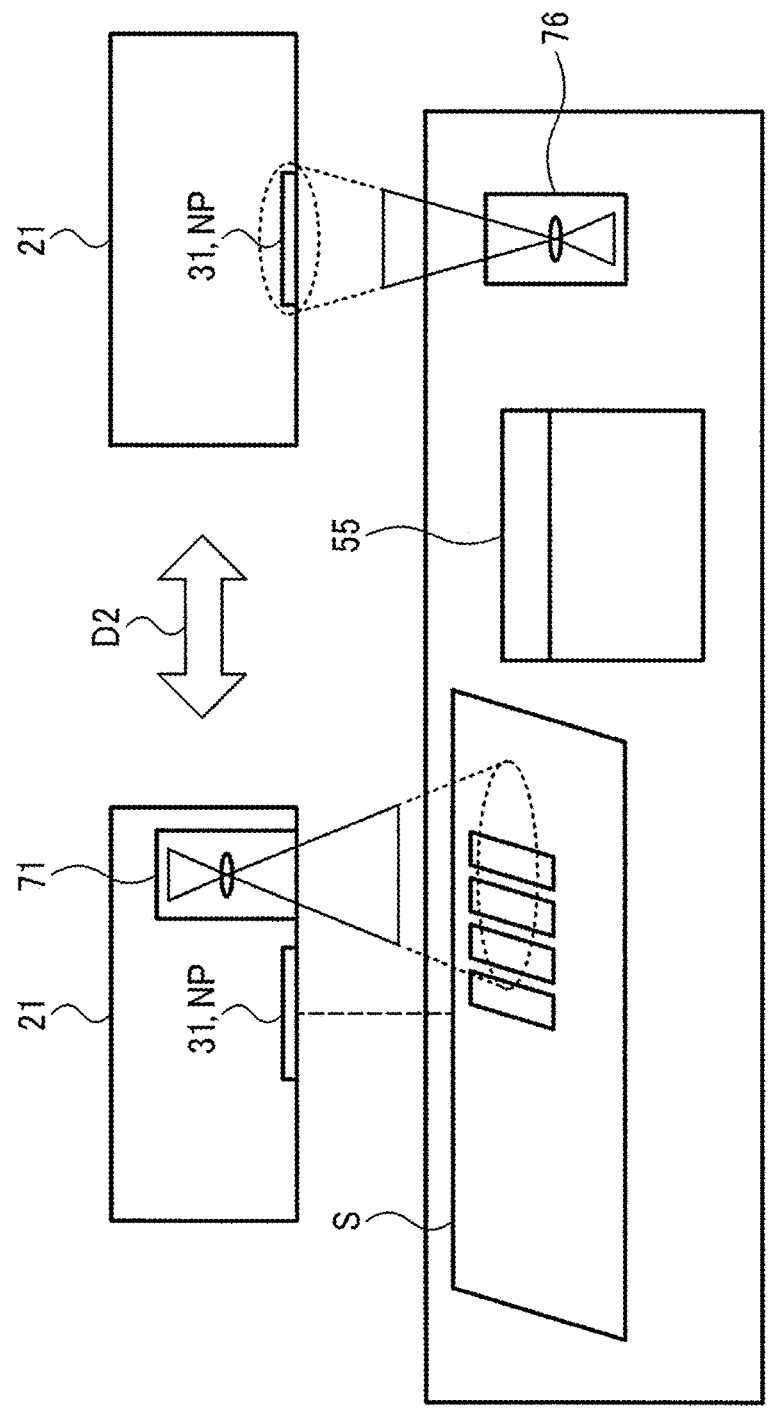
FIG. 6 is a diagram showing a positional relationship between a carriage, a first imaging portion, a second imaging portion, and a wiping unit.

FIG. 6 is a diagram schematically showing a relationship between the carriage 21, the wiping unit 55, the first imaging portion 71, and the second imaging portion 76. As described above, the carriage 21 moves along D2, which is the main scanning direction, in a state where the print head 30 and the first imaging portion 71 are mounted thereon. The wiping unit 55 and the second imaging portion 76 are provided at positions other than the carriage 21 of the printing device 1 and at positions facing the carriage when the carriage 21 moves to a given position.

As shown in FIG. 6, when the carriage 21 is moved to a position facing the print medium, the first imaging portion 71 can image a printing result. Further, when the carriage 21 moves to a position facing the wiping unit 55, the wiping unit 55 can wipe the nozzle plate NP. In addition, when the carriage 21 moves to a position facing the second imaging portion 76, the second imaging portion 76 can image a state of the nozzle plate NP.

3. Factor of Discharge Defect

Figure 7:
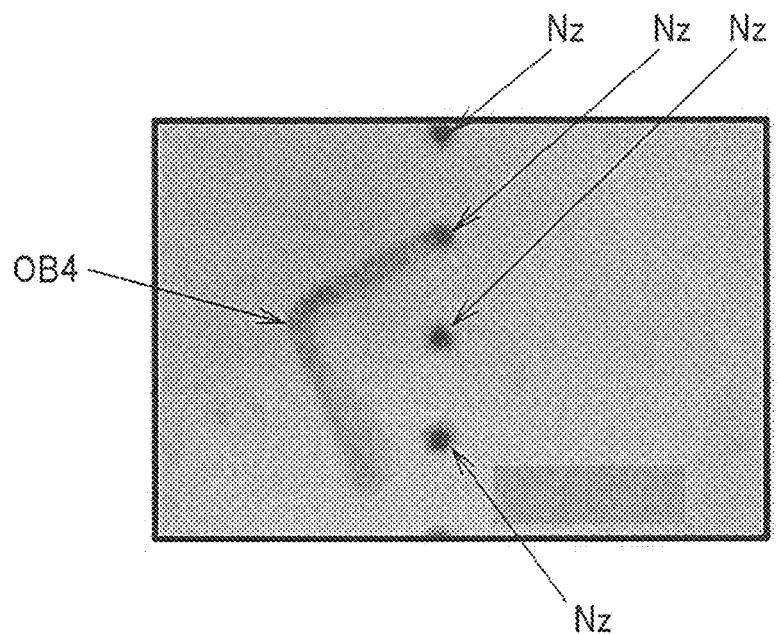
FIG. 7 is an explanatory diagram of an adhesive foreign matter.

FIG. 7 is a diagram showing a foreign matter adhering to the nozzle plate surface, and an example of the nozzle surface image information imaged using, for example, the second imaging unit 75. Nz in FIG. 7 represents each nozzle hole. OB4 in FIG. 7 is the foreign matter adhering to the nozzle plate surface. Hereinafter, the foreign matter adhering to the nozzle plate surface is referred to as an adhesive foreign matter OB4.

The adhesive foreign matter OB4 is, for example, the fluff or the paper dust adhering to the nozzle plate surface. For example, the adhesive foreign matter OB4 is also called floating fluff. Since the adhesive foreign matter OB4 is a foreign matter that does not enter an inside of the nozzle hole, the ink droplets themselves are normally discharged from the nozzle hole even when the adhesive foreign matter OB4 is present. Therefore, even when the adhesive foreign matter OB4 is present, the discharge defect does not always occur immediately.

However, when the adhesive foreign matter OB4 is positioned on a flight path of the ink droplets, the ink droplets come into contact with the adhesive foreign matter OB4 after being discharged from the nozzle hole. Since the adhesive foreign matter OB4, such as the floating fluff, is an obstacle of the flying ink droplets, the ink droplets do not normally reach the print medium even when the ink droplets are normally discharged from the nozzle hole. Further, when the adhesive foreign matter OB4 is large, there is a possibility that the ink propagates the adhesive foreign matter OB4, thereby leading to an ink dripping phenomenon.

Figure 8:
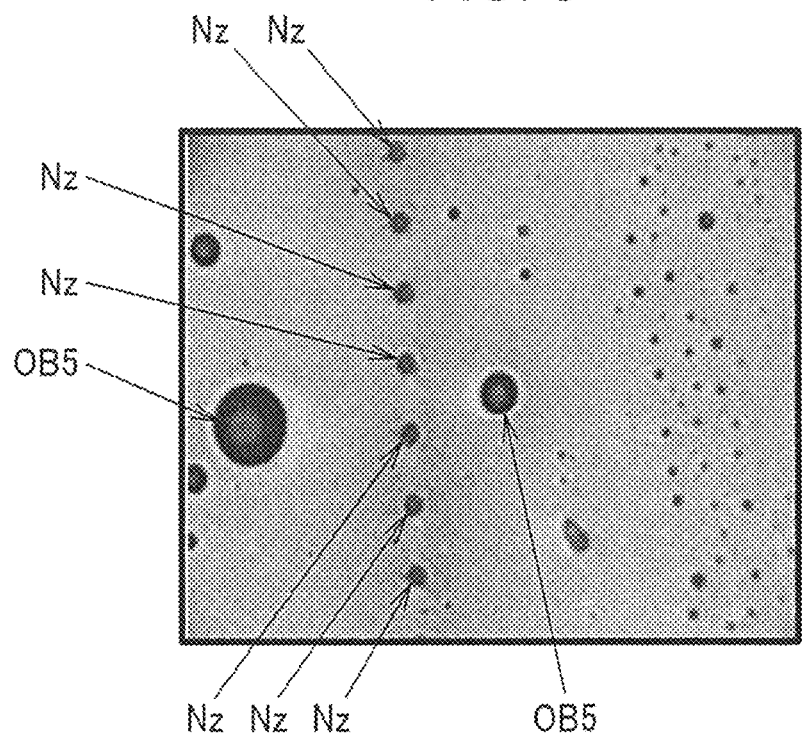
FIG. 8 is an explanatory diagram of a liquid droplet.

FIG. 8 is a diagram showing a liquid droplet OB5 adhering to the nozzle plate surface, and is an example of the nozzle surface image information imaged using, for example, the second imaging unit 75. Nz in FIG. 8 represents each nozzle hole.

Here, the liquid droplet OB5 is, for example, a water droplet generated by dew condensation, an ink droplet generated by mist, or both the water droplet and the ink droplet. For example, when the temperature of the nozzle plate NP is relatively lower than the ambient temperature, the dew condensation occurs due to the temperature difference. The dew condensation is more likely to occur as the temperature difference increases or as humidity inside or in a surrounding environment of the printing device 1 increases. In addition, there are cases in which mist, which is atomized ink, is generated by the printing operation and the ink droplets adhere to the nozzle plate surface due to the mist.

Even when the liquid droplet OB5 adheres to the nozzle plate surface, the liquid droplet OB5 does not directly influence the ink discharge from the nozzle hole when the liquid droplet OB5 is not present in the vicinity of the nozzle hole. However, when the liquid droplet OB5 comes into contact with a nozzle hole edge portion because a size of the liquid droplet OB5 increases with time or a position thereof changes, a meniscus of the nozzle hole is influenced, so that the discharge defect is caused.

Figure 9:
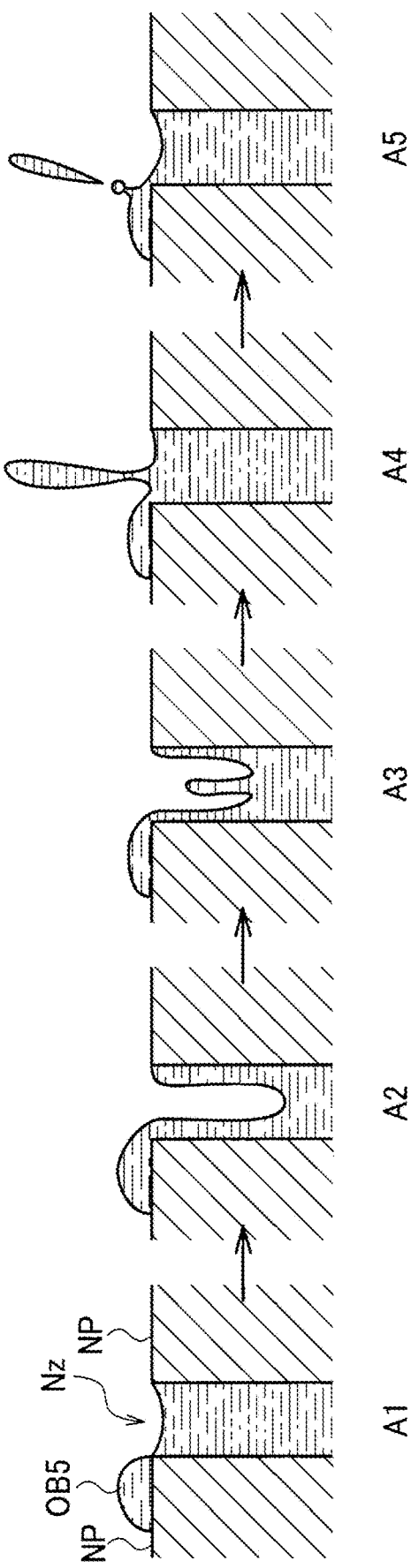
FIG. 9 is a diagram showing the occurrence of flight bending due to the liquid droplet.

FIG. 9 is a diagram showing flight bending on the nozzle plate surface due to the liquid droplet OB5. In FIG. 9, an upward direction is an ink discharge direction. A1 in FIG. 9 is a state before the ink is discharged, and here, the liquid droplet OB5 adheres to a vicinity of the nozzle Nz. As shown in A2, when the piezo element PZT is driven, a liquid surface of the ink is drawn in a direction opposite to the discharge direction. Hereinafter, a liquid surface shape is referred to as meniscus. Thereafter, as shown in A3 and A4, the meniscus tries to return to an original state while the ink is discharged. However, when the liquid droplet OB5 is present in the vicinity of the nozzle Nz, the ink is pulled toward a side of the liquid droplet when the meniscus and the discharged ink are separated as shown in A5. As a result, a part of the discharged ink has a bent discharge direction and lands at a position shifted to the side of the liquid droplet, compared to an original landing position.

As shown in FIG. 7 and FIG. 8, in the nozzle surface image information, the adhesive foreign matter OB4 or the liquid droplet OB5 is imaged in an aspect distinguishable from the nozzle Nz and the nozzle plate NP. Therefore, the nozzle surface image information includes information related to the adhesive foreign matter OB4 or the liquid droplet OB5.

The processing portion 220 may perform a process of detecting the adhesive foreign matter OB4 or the liquid droplet OB5 from the nozzle surface image information. For example, the processing portion 220 can detect the adhesive foreign matter OB4 or the liquid droplet OB5 from the nozzle surface image information by using an image processing for detecting a difference in saturation, an edge detection processing, or the like. Alternatively, the processing portion 220 may detect the adhesive foreign matter OB4 or the liquid droplet OB5 from the nozzle surface image information by acquiring the nozzle surface image information in a state where the adhesive foreign matter OB4 or the liquid droplet OB5 is not present as a reference image and comparing the reference image with the nozzle surface image information.

For example, the processing portion 220 obtains defect factor information related to at least one of the number of foreign matters or liquid droplets, a size or a ratio of the foreign matters or the liquid droplets, and a distance distribution of the foreign matters or the liquid droplets from the nozzle hole based on the nozzle surface image information.

For example, the processing portion 220 specifies, for each area of the nozzle surface image information, an area included in any of a nozzle plate area which is the nozzle plate surface, an adhesive foreign matter area which is the adhesive foreign matter OB4, and a liquid droplet area which is the liquid droplet OB5. Here, the area may be one pixel or a set of a plurality of pixels. Further, the processing portion 220 determines one or more continuous adhesive foreign matter areas as one adhesive foreign matter OB4, and determines one or more continuous liquid droplet areas as one liquid droplet OB5. The number of foreign matters or liquid droplets is information on at least one of the number of adhesive foreign matters OB4 and the number of liquid droplets OB5 included in the nozzle surface image information.

In addition, the processing portion 220 sets the number of areas or the number of pixels included in one detected adhesive foreign matter OB4 as a size of the adhesive foreign matter OB4. When a plurality of adhesive foreign matters OB4 are detected, the processing portion 220 obtains a size for each adhesive foreign matter OB4. The processing portion 220 may set all pieces of information on the sizes of one or more adhesive foreign matters OB4 as the defect factor information, or may set statistics, such as the maximum value, as the defect factor information. Further, the processing portion 220 may obtain a total value of the sizes of the adhesive foreign matters OB4 with respect to sizes in all the pieces of nozzle surface image information as the ratio of the foreign matter. The same applies to a size or a ratio of the liquid droplet OB5.

Further, the processing portion 220 obtains a distance between the detected one adhesive foreign matter OB4 and the nozzle Nz. As shown in FIG. 7, since the nozzle surface image information includes the plurality of nozzles Nz, the processing portion 220 obtains a distance between the adhesive foreign matter OB4 and the nozzle Nz closest to the adhesive foreign matter OB4. The distance may be a distance between an end point of the adhesive foreign matter OB4 and an end point of the nozzle Nz, may be a distance between a center of the adhesive foreign matter OB4 and a center of the nozzle Nz, or may be the other distance. The processing portion 220 obtains a distance distribution based on a set of distances obtained for the plurality of adhesive foreign matters OB4. The distance distribution may be information in which the distance and a frequency as in a histogram are associated with each other, or may be statistical information including an average value, a dispersion, and the like.

As described above, adhesion itself of the adhesive foreign matter OB4 or the liquid droplet OB5 to the nozzle plate surface does not become a problem, but a fact that the adhesive foreign matter OB4 or the liquid droplet OB5 is positioned in the vicinity of the nozzle Nz becomes the problem. Further, the larger the number of the adhesive foreign matters OB4 or the liquid droplets OB5, the larger the size and ratio, and the shorter the distance from the nozzle Nz, the higher the probability of entering the discharge defect. That is, the defect factor information, such as the number, the size, the ratio, and the distance distribution, is information useful for estimating whether or not the adhesive foreign matter OB4 or the liquid droplet OB5 included in the nozzle surface image information will cause a future discharge defect. When the defect factor information is used, it is possible to obtain the maintenance information with high accuracy.

4. Maintenance

As a maintenance operation that can be performed by the printing device 1 to prevent the discharge defect, for example, a wiping operation, a minute suction operation, or the flushing operation can be considered.

The wiping operation represents an operation of wiping the nozzle plate surface using the wiping unit 55. The wiping operation may be, for example, an operation in which a wiping material of the wiping unit 55 comes into contact with the nozzle plate NP while relatively moving in a given direction along the nozzle plate surface. Hereinafter, the wiping operation will be referred to as a mopping operation. For example, the controller 100 realizes the mopping operation by simultaneously executing the control of moving the carriage 21 along D2 which is the main scanning direction and the control of pressing the wiping material of the wiping unit 55 against the nozzle plate NP. Alternatively, the controller 100 may realize the mopping operation by controlling the wiping material, which is a winding-type cloth, to be pressed against the nozzle plate NP while winding the wiping material. In the mopping operation, the wiping material moves on the nozzle plate surface, so that an effect of removing the adhesive foreign matter OB4 or the liquid droplet OB5 is great.

However, the wiping operation is not limited thereto. The wiping operation may be an operation in which the wiping material comes into contact with the nozzle plate NP while maintaining a positional relationship in a direction along the nozzle plate surface. Hereinafter, the wiping operation is referred to as a pressing operation. For example, the controller 100 realizes the pressing operation by stopping the carriage 21 at the position facing the wiping unit 55 and then pressing the wiping material of the wiping unit 55 against the nozzle plate NP. In the pressing operation, the force acting in the direction along the nozzle plate surface is suppressed as compared with the mopping operation, so that it is possible to suppress the occurrence of abnormality in a normal nozzle. For example, it is possible to prevent thickened mist from being inserted into the nozzle hole.

The minute suction operation represents an operation of sucking a minute amount of ink from a side of the nozzle plate surface of the print head 30. The minute suction operation is performed by, for example, the ink suction unit 50. For example, the ink suction unit 50 can execute a suction operation, which includes a normal suction operation and the minute suction operation, at a plurality of suction intensities. The suction intensity can be adjusted using a magnitude of negative pressure, pressurization, or a suction time. The minute suction operation represents an operation in which the amount of ink discharged from the nozzle Nz is small as compared with other operations such as the normal suction operation. For example, when the minute suction is performed and the nozzle plate surface is wet with the ink, it is possible to suppress influence on the nozzle Nz due to wiping. In addition, the minute suction operation also has an effect of stabilizing ink flight by adjusting the meniscus.

The flushing operation represents an operation of discharging ink from the nozzle Nz at a position which does not face the print medium. The discharge of ink in the flushing is realized by the same operation as in the case of printing. For example, when the print head 30 is a piezo head as shown in FIG. 4, the flushing operation is executed by driving the piezo element PZT as the same as in the case of printing. Since the flushing operation is provided with the discharge of ink, it is possible to eliminate minor foreign matters and the like. In addition, when the flushing operation is performed, it is possible to stabilize a state of the discharge of ink.

The printing device 1 executes one or more combinations of maintenance operations, such as the wiping operation, the minute suction operation, and the flushing operation, as a maintenance sequence. In the method of the present embodiment, the maintenance sequence may be determined in advance regardless of the nozzle surface image information. For example, when the information processing system 200 determines that maintenance is necessary or when the recommended execution timing of maintenance output by the information processing system 200 is reached, the printing device 1 may sequentially execute a prescribed maintenance sequence. For example, in the method according to the related art, a maintenance sequence that satisfies that the amount of ink required for maintenance is small, that time required for maintenance is short, or both of them is preferentially executed. However, as will be described later as a modification example, the information processing system 200 of the present embodiment may execute a process of determining the maintenance sequence.

5. Examples of Learning Process and Inference Process

In the method of the present embodiment, the maintenance information is obtained when the machine learning is used. Hereinafter, specific examples of the learning process and the inference process will be described.

5.1 Learning Process

Figure 10:
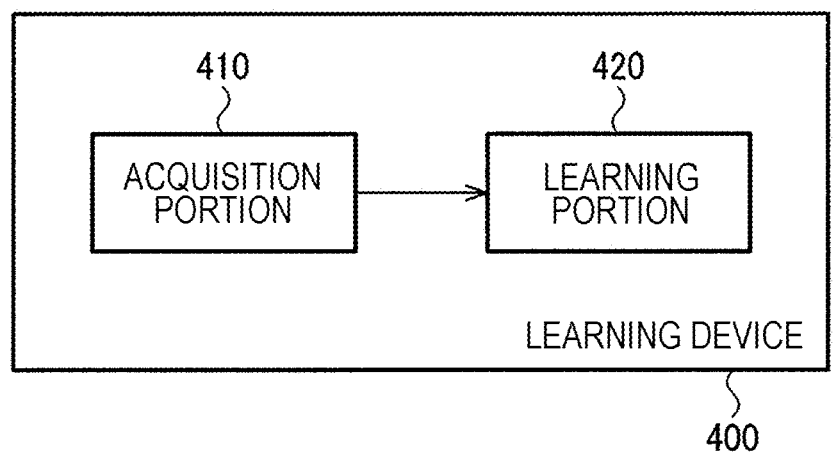
FIG. 10 is a configuration example of a learning device.

FIG. 10 is a diagram showing a configuration example of the learning device 400. The learning device 400 includes an acquisition portion 410 that acquires training data used for learning, and a learning portion 420 that performs the machine learning based on the training data.

The acquisition portion 410 is a communication interface for acquiring, for example, the training data from another device. Alternatively, the acquisition portion 410 may acquire the training data held by the learning device 400. For example, the learning device 400 includes a storage portion (not shown), and the acquisition portion 410 is an interface for reading the training data from the storage portion. The learning in the present embodiment is, for example, supervised learning. The training data in the supervised learning is a data set in which input data and a correct answer label are associated with each other.

The learning portion 420 performs the machine learning based on the training data acquired by the acquisition portion 410, and generates the learned model. The learning portion 420 of the present embodiment includes the following hardware. The hardware can include at least one of the circuit that processes the digital signal and the circuit that processes the analog signal. For example, the hardware can consist of one or more circuit devices mounted on the circuit substrate or one or more circuit elements.

Further, the learning portion 420 may be realized by a processor including the hardware. The learning device 400 includes a memory that stores information and a processor that operates based on information stored in the memory. The information includes, for example, a program and various data. It is possible to use various processors, such as a CPU, a GPU, and a DSP, as the processor. The memory may be a semiconductor memory, may be a register, may be a magnetic storage device, or may be an optical storage device. For example, the memory stores commands that can be read by the computer, and, when the commands are executed by the processor, the functions of respective portions of the learning device 400 are realized as processes. For example, the memory stores a program that defines a learning algorithm, and the processor executes the learning process by performing an operation according to the learning algorithm.

More specifically, the acquisition portion 410 acquires the data set in which the nozzle surface image information obtained by photographing the nozzle plate surface of the print head 30 and the maintenance information representing the necessity of maintenance of the print head 30 or the recommended execution timing of maintenance are associated with each other. Specifically, the information acquired here includes learning nozzle surface image information and learning maintenance information, which are used for the machine learning. The learning portion 420 generates the learned model by performing the machine learning on the maintenance conditions for the print head 30 for executing maintenance at a timing before the discharge defect of the print head 30 occurs, based on the data set.

According to the method of the present embodiment, the machine learning is performed using the nozzle surface image information related to the future discharge defect. When a result of the machine learning is used, it is possible to determine the necessity and timing of maintenance according to a specific situation of the nozzle plate NP.

The learning device 400 shown in FIG. 10 may be included in, for example, the printing device 1 shown in FIG. 2. In this case, the learning portion 420 corresponds to the controller 100 of the printing device 1. More specifically, the learning portion 420 may be the processor 102. The printing device 1 accumulates the nozzle surface image information and the maintenance information in the memory 103. The acquisition portion 410 may be an interface that reads the information accumulated in the memory 103. In addition, the printing device 1 may transmit the accumulated information to external equipment such as the computer CP or the server system. The acquisition portion 410 may be the interface portion 101 that receives the training data necessary for the learning from the external equipment.

Further, the learning device 400 may be included in equipment different from the printing device 1. For example, the learning device 400 may be included in external equipment connected to the printing device 1 via the network. Here, the network may be a private network such as an intranet, or may be a public communication network such as the Internet. The network may be wired or wireless. For example, the learning device 400 may be included in the information processing system 200.

Figure 11:
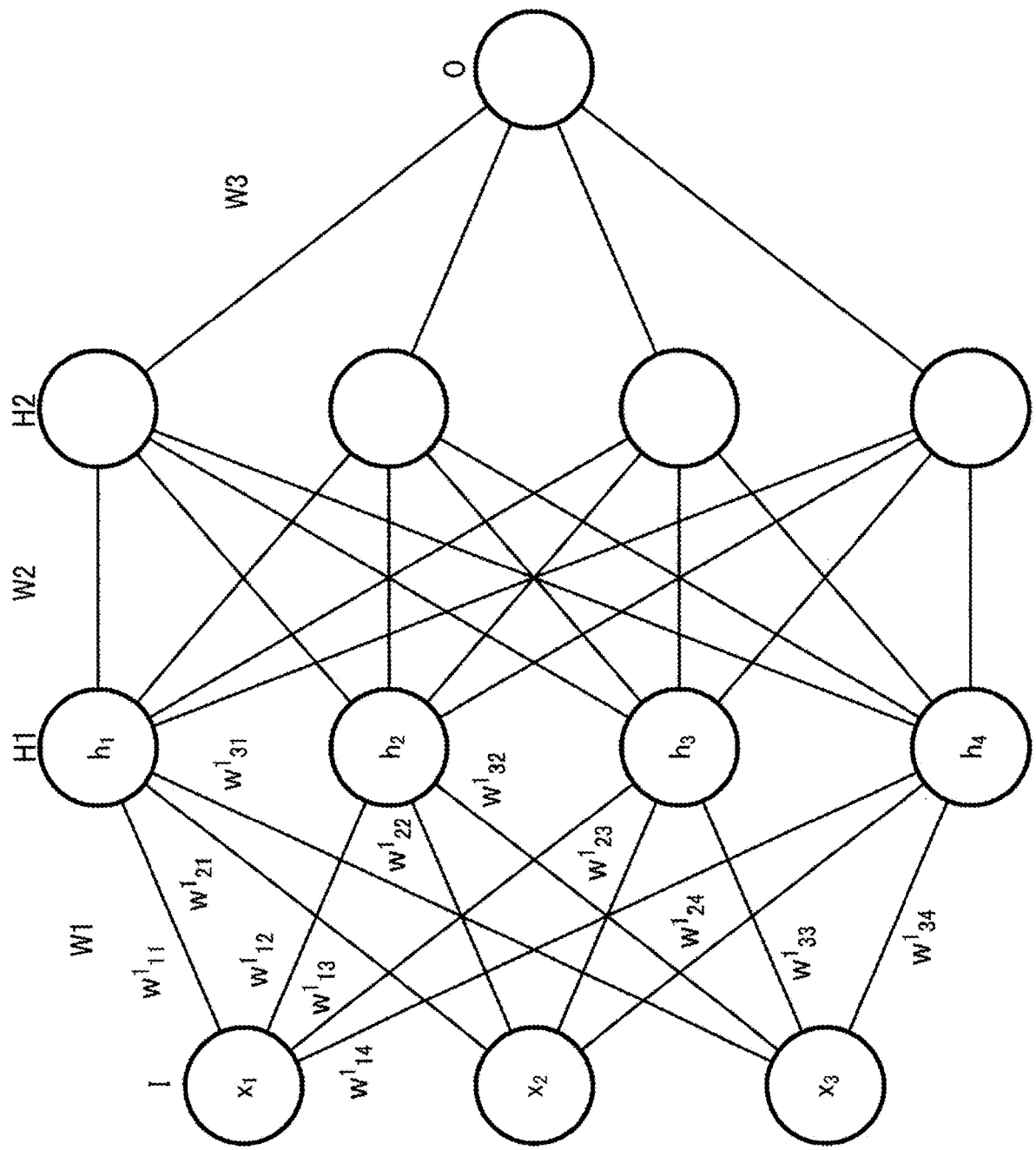
FIG. 11 is an example of a neural network.

As a specific example of the machine learning, the machine learning using a neural network will be described. FIG. 11 is an example of a basic structure of the neural network. The neural network is a mathematical model that simulates a brain function on a computer. One circle in FIG. 11 is called a node or a neuron. In the example of FIG. 11, the neural network includes an input layer, two intermediate layers, and an output layer. The input layer is I, the intermediate layers are H1 and H2, and the output layer is O. However, various modifications can be performed on the number of layers of the intermediate layers and the number of nodes included in each layer. Each of the nodes included in the input layer is combined with nodes of H1 which is a first intermediate layer. Each of the nodes included in the first intermediate layer is combined with nodes of H2 which is a second intermediate layer, and each of the nodes included in the second intermediate layer is combined with a node of the output layer. The intermediate layer may be rephrased as a hidden layer.

The input layer includes nodes that output input values, respectively. In the example of FIG. 11, the neural network receives $x_1$, $x_2$, and $x_3$ as inputs, and the respective nodes in the input layer output $x_1$, $x_2$, and $x_3$, respectively. Any preprocessing may be performed on the input values, and the respective nodes in the input layer may output values obtained after the preprocessing.

In the neural network, a weight W is set between the nodes. W1 in FIG. 11 is a weight between the input layer and the first intermediate layer. W1 represents a set of weights between a given node included in the input layer and a given node included in the first intermediate layer. When a weight between a p-th node in the input layer and a q-th node in the first intermediate layer is expressed as $w^1_{pq}$, W1 in FIG. 11 is information including 12 weights of $w^1_{11}$ to $w^1_{34}$.

In each of the nodes in the first intermediate layer, a calculation is performed of obtaining a product sum of an output and a weight of each node, which is connected to the relevant node, in an immediately before layer and further adding a bias thereto. Further, an activation function f, which is a non-linear function, is used for the calculation at each node. As the activation function f, for example, a ReLU function is used. The ReLU function becomes 0 when a variable is 0 or less and becomes a value of the variable itself when the variable is larger than 0. However, it is known that various functions can be used as the activation function f, that is, a sigmoid function may be used or a function obtained by improving the ReLU function may be used.

In addition, the same applies to subsequent layers. For example, when a weight between the first intermediate layer and the second intermediate layer is set to W2, a product sum calculation is performed using the outputs of the first intermediate layer and the weight W2, the bias is added, and a calculation of applying the activation function is performed on the nodes in the second intermediate layer. At the node in the output layer, a calculation is performed of weighting and adding the outputs of the immediately before layer and adding the bias. In the example of FIG. 11, the layer immediately before the output layer is the second intermediate layer. The neural network uses a result of the calculation in the output layer as an output of the neural network.

As can be seen from the above description, it is necessary to set an appropriate weight and bias in order to obtain a desired output from inputs. Hereinafter, the weight is also referred to as a weighting coefficient. Further, the weighting coefficient may include the bias. In the learning, a data set is prepared in which a given input x and a correct output at the input are associated with each other. The correct output is the correct answer label. The learning process of the neural network can be considered as a process of obtaining the most probable weighting coefficient based on the data set. In the learning process of the neural network, various learning methods, such as a backpropagation method, are known. In the present embodiment, since the learning methods can be widely applied, detailed description thereof will be omitted. The learning algorithm when the neural network is used is an algorithm using both a process of acquiring a forward result by performing a calculation, such as the product sum calculation described above, and a process of updating weighting coefficient information using the backpropagation method.

In addition, the neural network is not limited to the configuration shown in FIG. 11. For example, in the learning process of the present embodiment and the inference process which will be described later, a widely-known convolutional neural network (CNN) may be used. The CNN includes a convolution layer and a pooling layer. In the convolution layer, a convolution calculation is performed. Here, specifically, the convolution calculation is a filtering process. In the pooling layer, a process of reducing vertical and horizontal sizes of data is performed. When the learning process is performed using the backpropagation method or the like in the CNN, a filter characteristic used for the convolution calculation is learned. That is, the weighting coefficient in the neural network includes the filter characteristic in the CNN. In addition, various models, such as a recurrent neural network (RNN), are known as the neural network, and the various models can be widely applied in the present embodiment.

Hereinabove, an example in which the learned model is a model using the neural network is described. However, the machine learning in the present embodiment is not limited to a method using the neural network. For example, it is possible to apply machine learning using various well-known methods, such as a support vector machine (SVM), or machine learning using a method developed from the various methods to the method of the present embodiment.

Figure 12:
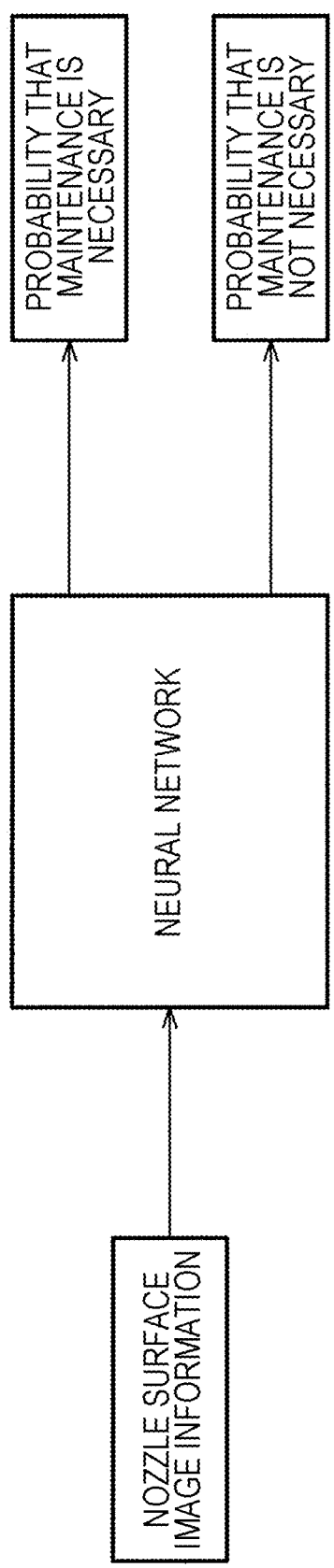
FIG. 12 is an example of input and output of the neural network.

FIG. 12 is a diagram showing the input and the output of the neural network. The neural network receives the nozzle surface image information as the input, and outputs the maintenance information as output data. As described above, the nozzle surface image information is image information imaged by the second imaging unit 75. The maintenance information is information representing, for example, the necessity of maintenance of the printing device 1 at a processing target timing. For example, the output of the neural network includes information representing certainty in which maintenance is necessary and information representing certainty in which maintenance is not necessary. When the output layer of the neural network is a widely-known softmax layer, the maintenance information is probability data in which a total value of the outputs is 1, one of which represents a probability that maintenance is necessary, and the other of which represents a probability that maintenance is not necessary.

Figure 13:
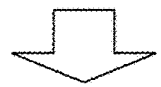
FIG. 13 is an example of observation data and training data used for machine learning.

FIG. 13 is a diagram showing a relationship between observation data collected for learning and training data generated based on the observation data and used for the machine learning. For example, in the learning stage, the nozzle surface image information is accumulated by operating the printing device 1. In FIG. 13, the nozzle surface image information acquired at a timing $t_1$ is referred to as IM1. The same applies to a timing $t_2$ and thereafter. In addition, at each timing, it is determined whether or not the discharge defect occurs. Whether or not the discharge defect occurs may be determined based on the discharge result information which is an output of the first imaging portion 71, or may be determined in such a way that a user visually confirms the printing result. In an example of FIG. 13, the discharge defect does not occur at timings of $t_1$ to $t_{i-1}$, and the discharge defect occurs at a timing of $t_i$. Here, i is an integer of 2 or more. Further, an interval of each timing can be set in various ways.

In this case, since the discharge defect occurs at $t_i$, it is considered that, for example, the adhesive foreign matter OB4 or the liquid droplet OB5 is in a state of hindering ink from flying in IMi. A possibility is undeniable that the adhesive foreign matter OB4 or the liquid droplet OB5 is not generated up to $t_{i-1}$ and is suddenly generated at $t_i$. However, there is a high probability that the adhesive foreign matter OB4 or the liquid droplet OB5 is generated at a timing before $t_i$, the number, size, ratio, distance from the nozzle Nz, and the like change with time from the timing, so that the discharge defect is caused at the timing of $t_i$. In other words, it is considered that, even before the timing $t_i$, the adhesive foreign matter OB4 or the liquid droplet OB5 that is the factor of the discharge defect is imaged at $t_i$ and the sign of the discharge defect appears at $t_i$ in the nozzle surface image information. Furthermore, there is a high probability that a sign of the discharge defect appears at $t_i$ in the nozzle surface image information at the timing, such as $t_{i-1}$ and $t_{i-2}$, in which the time difference from $t_i$ is a given time difference threshold or less.

Therefore, for example, as shown in FIG. 13, IMj to IMi, which are the nozzle surface image information acquired at timings of $t_j$ to $t_i$, are associated with information representing that maintenance is necessary as the correct answer label. Further, IM1 to IMj-1, which are the nozzle surface image information acquired at timings of $t_1$ to $t_{j-1}$ before the timing $t_j$, are associated with information representing that maintenance is not necessary as the correct answer label. Here, j is an integer less than i, and a difference between i and j corresponds to the time difference threshold. Various modifications can be performed on a specific value of j. In this way, the training data, in which the input and the output shown in FIG. 12 are associated with each other, is acquired.

Figure 14:
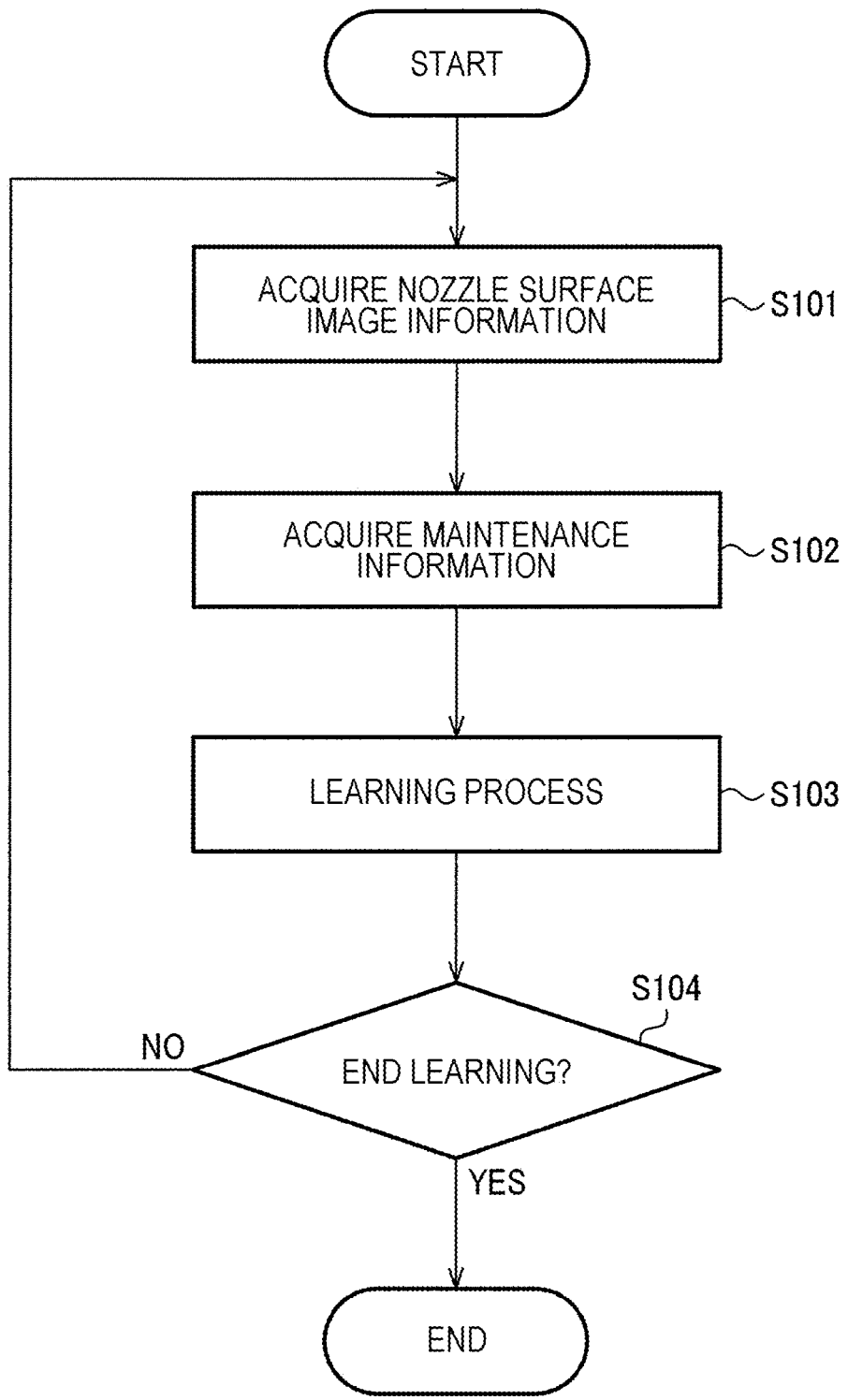
FIG. 14 is a flowchart illustrating a learning process.

FIG. 14 is a flowchart showing the learning process based on the training data. When the process is started, in steps S101 and S102, the acquisition portion 410 of the learning device 400 acquires one data set in which the nozzle surface image information and the maintenance information are associated with each other. The one data set corresponds to one line data in the training data of FIG. 13.

In step S103, the learning portion 420 executes a specific learning process. The learning portion 420 inputs the nozzle surface image information to the neural network, and obtains an output by performing the forward calculation using the weighting coefficient information at that time. The output includes, for example, two numerical data whose total is 1 as described above.

The learning portion 420 obtains an error function based on the output and the maintenance information. The error function is, for example, a sum of absolute difference values between two numerical values that are the outputs and two numerical values that are the maintenance information. For example, when the correct answer label represents that maintenance is necessary, the maintenance information is data in which the probability that maintenance is necessary is 1 and the probability that maintenance is not necessary is 0. In addition, for example, when the correct answer label represents that maintenance is not necessary, the maintenance information is data in which the probability that maintenance is necessary is 0 and the probability that maintenance is not necessary is 1. However, a method for calculating the error function is not limited thereto, and various modifications can be performed. Further, in step S103, the learning portion 420 updates the weighting coefficient information so as to reduce the error function. In the process, the backpropagation method can be applied as described above.

Steps S101 to S103 are processes based on one data set. In step S104, the learning portion 420 determines whether or not to end the learning process. For example, the learning portion 420 ends the learning process when the process is performed based on a predetermined number or more of data sets or when a correct answer rate based on verification data is a predetermined value or more. The verification data is a part of the data set collected for the machine learning and represents a data set that is not used for a weighting coefficient information updating process. Since the verification data is data associated with the maintenance information which is the correct answer label, the verification data can be used to verify whether or not the inference by the neural network is correct.

In a case of Yes in step S104, the learning portion 420 ends the learning process. The learning device 400 outputs the learned model, which is a learning result, to the information processing system 200. The information of the learned model is stored in the storage portion 230. In a case of No in step S104, the learning portion 420 returns to step S101 and continues the process. Specifically, the acquisition portion 410 reads a next data set, and the learning portion 420 updates the weighting coefficient information using the data set. FIG. 14 is an example of a flow of the learning process, and a specific process is not limited thereto. For example, methods, such as batch learning and mini-batch learning, are known in the machine learning, and the methods can be widely applied in the present embodiment. In addition, the learning process as described above may be added to a user environment in which the printing device 1 is used. The added learning process is a process for improving the learned model based on whether or not the necessity of maintenance and the recommended execution timing is appropriate based on the maintenance information output through the inference process when the printing device 1 is operated in the user environment. Further, the learned model generated by the added learning in the user environment may be installed in the printing device 1 newly installed in the user environment. In particular, when the learned model of the printing device 1 that is originally used is installed in a case where a new printing device 1 of the same model is installed, it is possible to obtain an appropriate inference result using the learned model, which is improved by the added learning based on the user environment, from a time of installation.

Hereinabove, an example is shown in which the nozzle surface image information is directly input to the neural network. As the neural network in this case, for example, the CNN is preferable. However, as described above, in the process of the present embodiment, the defect factor information, such as the number of adhesive foreign matters OB4 or liquid droplets OB5, the size, the ratio, and the distance from the nozzle Nz, may be obtained based on the nozzle surface image information. For example, the training data may be a data set in which the defect factor information obtained from the nozzle surface image information and the maintenance information representing whether or not maintenance is necessary are associated with each other.

5.2 Inference Process

Figure 15:
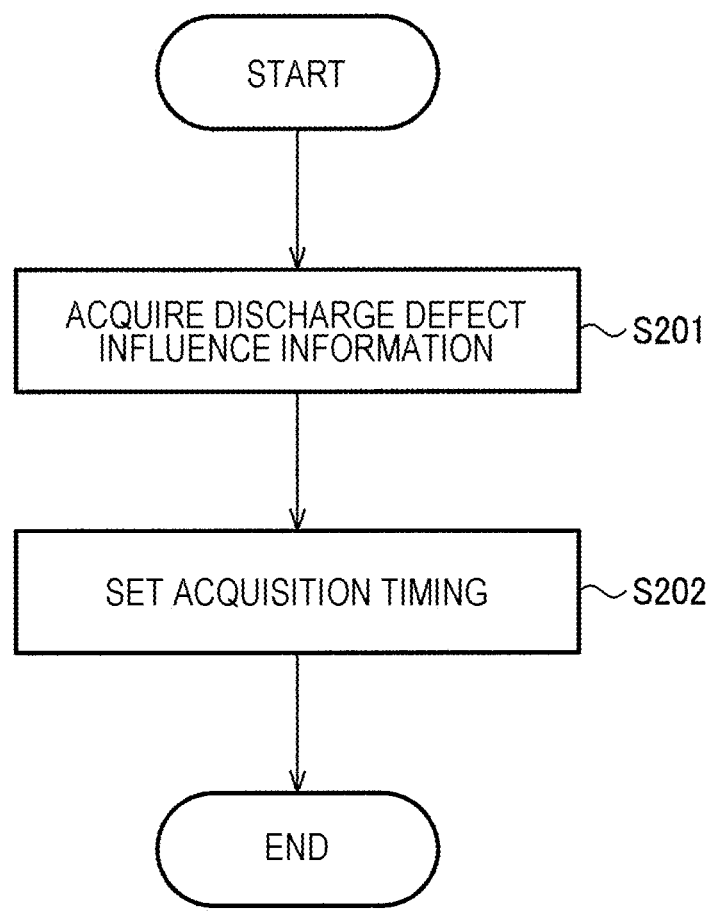
FIG. 15 is a flowchart illustrating a process of setting an acquisition timing.
Figure 16:
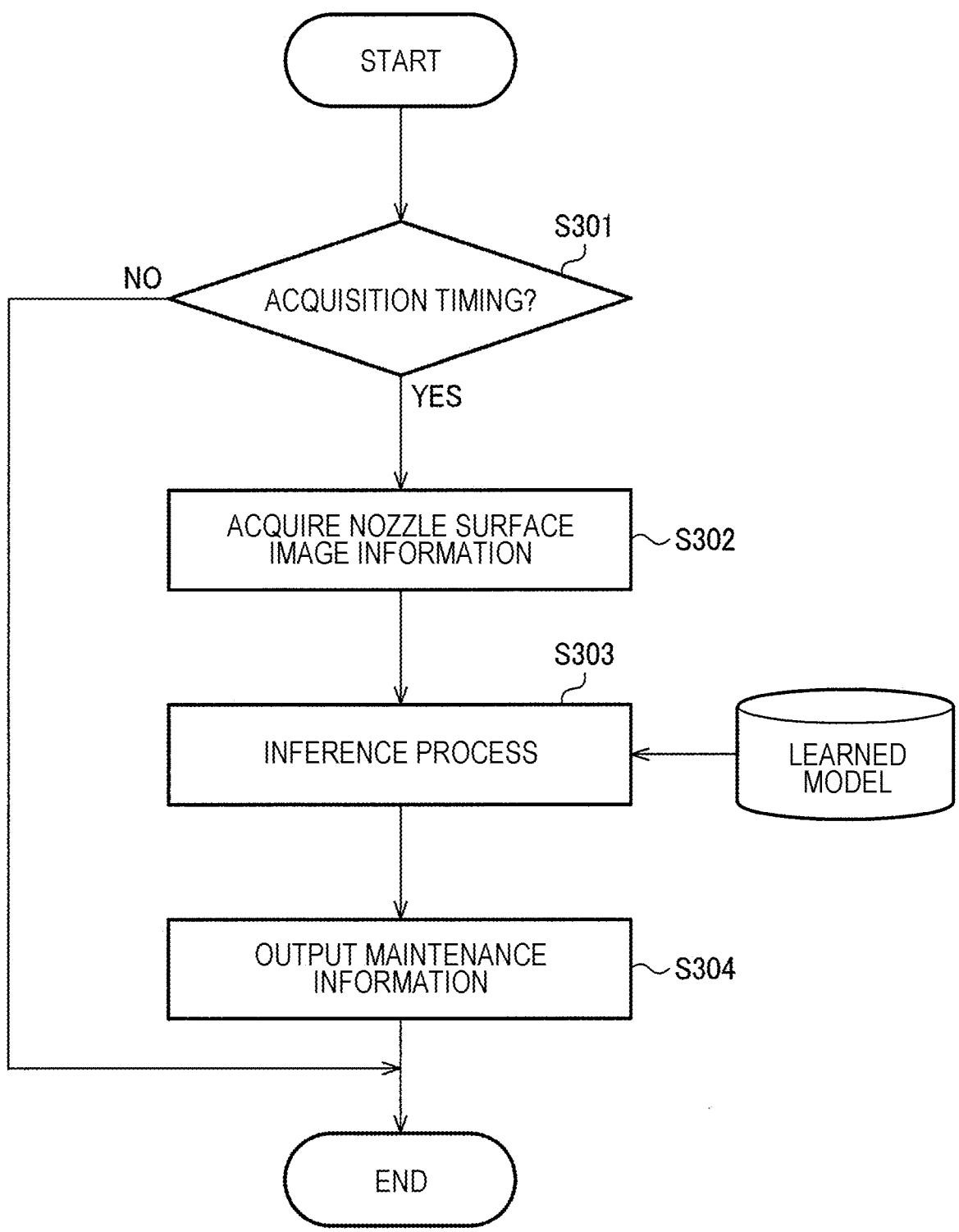
FIG. 16 is a flowchart illustrating a process of outputting maintenance information.

FIG. 15 and FIG. 16 are flowcharts showing the inference process executed in the information processing system 200.

The processing portion 220 may determine a nozzle surface image information acquisition timing based on discharge defect influence information which influences a future discharge defect. FIG. 15 is a flowchart showing the process. First, in step S201, the acquisition portion 210 acquires the discharge defect influence information. In step S202, the processing portion 220 sets the nozzle surface image information acquisition timing based on the acquired discharge defect influence information. The nozzle surface image information acquisition timing corresponds to maintenance information output timing, and, in a narrow sense, corresponds to a timing for determining the necessity of maintenance.

In this way, it is possible to determine the necessity of maintenance at an appropriate timing and frequency based on the discharge defect influence information. The discharge defect influence information is information which can be used to estimate whether or not the future discharge defect is likely to occur. When a frequency of determination of the necessity of maintenance is increased in a case where the discharge defects are likely to occur, it is possible to appropriately suppress the occurrence of discharge defect. In addition, when the frequency of determination of the necessity of maintenance is reduced in a case where the discharge defect is unlikely to occur, it is possible to suppress execution of excessive maintenance.

Here, the discharge defect influence information includes at least one information of dust fluff amount information in the printing device or on the print medium, print medium type information, temperature information, humidity information, and print condition information.

The dust fluff amount information is acquired by, for example, the dust sensor 93 such as the particle counter. The temperature information is acquired by the temperature sensor 91. The humidity information is acquired by the humidity sensor 92. The temperature information and the humidity information may be acquired based on the temperature sensor and the humidity sensor provided on the outside of the printing device 1. For example, an environmental temperature and an environmental humidity of a room in which the printing device 1 is installed may be used as the temperature information and the humidity information. The print medium type information is information for specifying the type of the print medium, and may be information representing paper or a cloth, or more detailed information such as plain paper or photographic paper. The type information is input by, for example, the user. The print condition information is, for example, a print duty. The print duty is information indicating, for example, a printing frequency, and represents, for example, the number of times that ink droplets are discharged from the nozzle Nz when printing is performed in a predetermined unit such as one page. For example, in solid printing in which a whole paper surface is a printing target, the print duty becomes high.

The dust fluff amount information is related to a tendency for the adhesive foreign matter OB4 on the nozzle plate surface to occur. The temperature information and the humidity information are related to a tendency for the liquid droplet OB5 to occur. The print medium type information is related to a tendency for the adhesive foreign matter OB4, such as fluff or paper dust, to occur. The print condition information is related to a tendency for the liquid droplet OB5 to occur due to the mist. That is, specifically, the nozzle surface image information is information related to the adhesive foreign matter OB4 or the liquid droplet OB5 that is the factor of the discharge defect, and the discharge defect influence information is information useful to estimate a change in the adhesive foreign matter OB4 or the liquid droplet OB5 with time. Therefore, when the pieces of information are used for the process, it is possible to estimate a tendency for the future discharge defect to occur, so that it is possible to determine the necessity of maintenance at an appropriate timing.

For example, in step S202, when at least one of the conditions is satisfied among a condition that the amount of fluff and the like is a first threshold value or more, a condition that a temperature difference between a temperature of the nozzle plate NP and a surrounding temperature is a second threshold value or more, a condition that humidity is a third threshold value or more, a condition that a tendency for fluff and paper dust on the print medium to occur is a fourth threshold value or more, and a condition that the print duty is a fifth threshold value or more, the processing portion 220 sets a period until a next timing, at which the necessity of maintenance is determined, to a first period which is relatively short. In addition, when none of the above conditions is satisfied, the processing portion 220 sets the period until the next timing, at which the necessity of maintenance is determined, to a second period which is relatively long. In this way, when it is determined that the discharge defect is likely to occur based on the discharge defect influence information, it is possible to set the frequency of determination of the necessity of maintenance to be higher than a case where the discharge defect is hard to occur.

The process in step S202 is not limited thereto. For example, the processing portion 220 may perform a calculation using a function of outputting the period until the next timing at which the necessity of maintenance is determined. Here, the function has at least one of the amount of fluff and the like, the temperature, the humidity, the type of print medium, and the print duty as a variable. The function is a function of outputting a small value as the amount of fluff and the like is large, as the temperature difference between the nozzle plate NP and the surrounding thereof is large, as the humidity is high, as fluff or paper dust is more likely to be generated on the print medium, and as the print duty is large.

FIG. 16 is a flowchart illustrating a process of determining the necessity of maintenance. When the process is started, first, in step S301, the processing portion 220 determines whether a current timing is the timing for determining the necessity of maintenance, that is, a timing for acquiring the nozzle surface image information. Specifically, the processing portion 220 determines whether or not the current timing is the timing set in step S202 of FIG. 15. In a case of No in step S301, the processing portion 220 ends the process.

In a case of Yes in step S301, in step S302, the acquisition portion 210 acquires the nozzle surface image information from the printing device 1. Specifically, the acquisition portion 210 acquires the image information which is an output of the second imaging unit 75.

In step S303, the processing portion 220 performs a process of determining the necessity of maintenance based on the learned model generated by the learning device 400 and the nozzle surface image information acquired in step S302. Specifically, the processing portion 220 inputs the nozzle surface image information to the learned model read from the storage portion 230, and obtains two numerical data by performing the forward calculation. As shown in FIG. 12, the two numerical data include the probability that maintenance is necessary and the probability that maintenance is not necessary. For example, the processing portion 220 determines that maintenance is necessary when the probability that maintenance is necessary is equal to or greater than the probability that maintenance is not necessary, and determines that maintenance is not necessary when the probability that maintenance is necessary is less than the probability that maintenance is not necessary.

In step S304, the processing portion 220 outputs the maintenance information. For example, the processing portion 220 transmits information which can specify whether or not maintenance is necessary to the printing device 1 as the maintenance information. When the printing device 1 receives the maintenance information representing that maintenance is necessary, the printing device 1 executes the maintenance sequence.

As described above, the processing portion 220 outputs the nozzle surface image information acquired at the acquisition timing set in the process shown in FIG. 15 and the maintenance information representing the necessity of maintenance at the acquisition timing based on the learned model. In this way, when the necessity of maintenance is determined at an appropriate timing and the machine learning is used at that time, it is possible to output highly accurate maintenance information.

Hereinabove, an example in which the processing portion 220 inputs the acquired nozzle surface image information as it is to the learned model is described. However, as described above, in the learning process, the input to the learned model is not limited to the nozzle surface image information, and the input may be the defect factor information related to at least one of the number, the size, and the ratio of foreign matters obtained based on the nozzle surface image information, the distance distribution from the nozzle hole, and the like. In this case, in step S303, the processing portion 220 outputs the maintenance information based on the defect factor information and the learned model. Specifically, the processing portion 220 obtains the defect factor information based on the nozzle surface image information, inputs the defect factor information to the learned model, and performs the forward calculation, thereby obtaining the maintenance information. In this way, it is possible to perform a process in consideration of the specific state of the adhesive foreign matter OB4 or the liquid droplet OB5, so that the accuracy of the maintenance information can be improved.

In addition, the calculation in the processing portion 220 according to the learned model in step S303, that is, the calculation for outputting the output data based on the input data may be executed by software or may be executed by hardware. In other words, the product-sum calculation executed at each node of FIG. 11, the filtering process executed at the convolution layer of the CNN, and the like may be executed by software. Alternatively, the calculation may be executed by a circuit device such as FPGA. In addition, the calculation may be executed by a combination of software and hardware. As described above, the operation of the processing portion 220 according to a command from the learned model can be realized by various aspects. For example, the learned model includes an inference algorithm and a weighting coefficient used in the inference algorithm. The inference algorithm is an algorithm for performing a filtering operation or the like based on the input data. In this case, both the inference algorithm and the weighting coefficient are stored in the storage portion 230, and the processing portion 220 may perform the inference process by software by reading the inference algorithm and the weighting coefficient. Alternatively, the inference algorithm may be realized by FPGA or the like, and the storage portion 230 may store the weighting coefficient. Alternatively, the inference algorithm including the weighting coefficient may be realized by FPGA or the like. In this case, the storage portion 230 that stores the information of the learned model is, for example, a built-in memory of FPGA.

6. Other Examples of Learning Process and Inference Process

The learning process and the inference process are not limited to the above, and various modifications can be performed. Hereinafter, other examples of the learning process and the inference process will be described.

6.1 Learning Process

Figure 17:
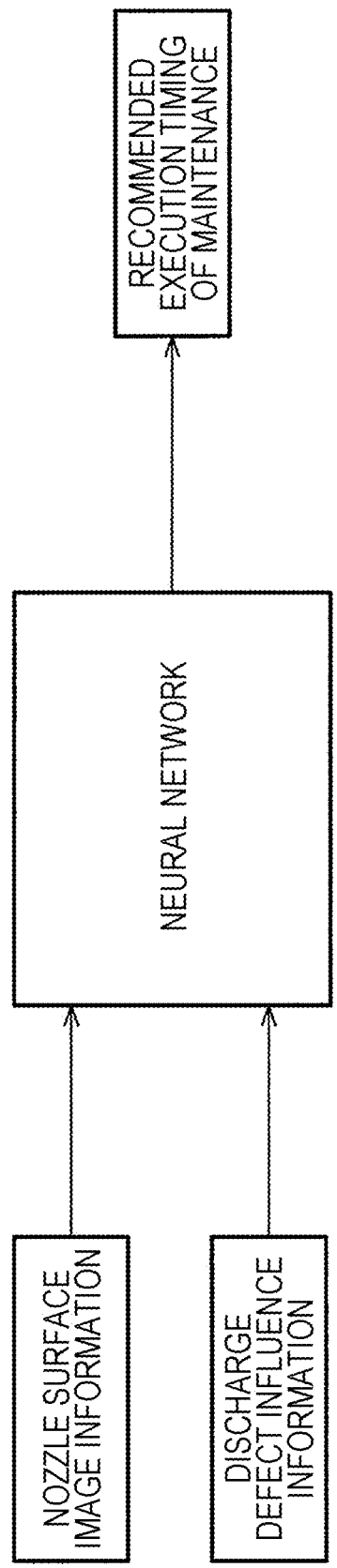
FIG. 17 is an example of input and output of the neural network.

FIG. 17 is a diagram showing input and output of the neural network. The neural network receives the nozzle surface image information and the discharge defect influence information as input, and outputs the maintenance information representing the recommended execution timing of maintenance as output data. The maintenance information is, for example, a numerical value representing time from the current timing to the recommended execution timing.

Figure 18:
FIG. 18 is an example of the observation data and the training data used for the machine learning.

FIG. 18 is a diagram showing the relationship between the observation data collected for the learning and the training data generated based on the observation data and used for the machine learning. For example, in the learning stage, the nozzle surface image information and the discharge defect influence information are accumulated by operating the printing device 1. The nozzle surface image information is the same as in FIG. 13. In FIG. 18, the discharge defect influence information acquired at the timing $t_1$ is referred to as e1. As described above, e1 represents at least one of the dust fluff amount information, the temperature information, the humidity information, the print medium type information, and the print condition information corresponding to the timing $t_1$. The same applies to the timing $t_2$ and thereafter. In addition, at each timing, it is determined whether or not the discharge defect occurs. The determination method is the same as the example described above with reference to FIG. 13.

In this case, since the discharge defect occurs at $t_i$, when the timing $t_1$ is used as a reference, the discharge defect occurs when the time corresponding to $t_i$-$t_1$ elapses. Therefore, it is possible to suppress the discharge defect by performing maintenance at a timing before $t_i$-$t_1$ elapses. The same applies to the timing $t_2$ and thereafter.

Further, as described above, even at a timing before there is a possibility that the nozzle surface image information shows a sign of the future discharge defect. Further, the discharge defect influence information is information related to the change in the adhesive foreign matter OB4 or the liquid droplet OB5 with time. That is, there is a possibility that the nozzle surface image information and the discharge defect influence information at the timing before $t_i$ indicates the sign of the discharge defect at $t_i$, and, when a data set associated with the pieces of information is used for the machine learning, the recommended execution timing of maintenance can be accurately estimated.

For example, as shown in FIG. 18, nozzle surface image information IM1 to IMi-1, which are acquired at the timings of $t_1$ to $t_{i-1}$ and discharge defect influence information e1 to ei-1 are associated with information representing recommended execution timings as the correct answer labels. FIG.

18 shows an example in which a timing before the timing, at which there is a high probability that the discharge defect occurs, by T is set as the recommended execution timing. T is a given positive number. When data, in which the correct answer label is negative, is present, the data may be excluded from the learning process.

Figure 19:
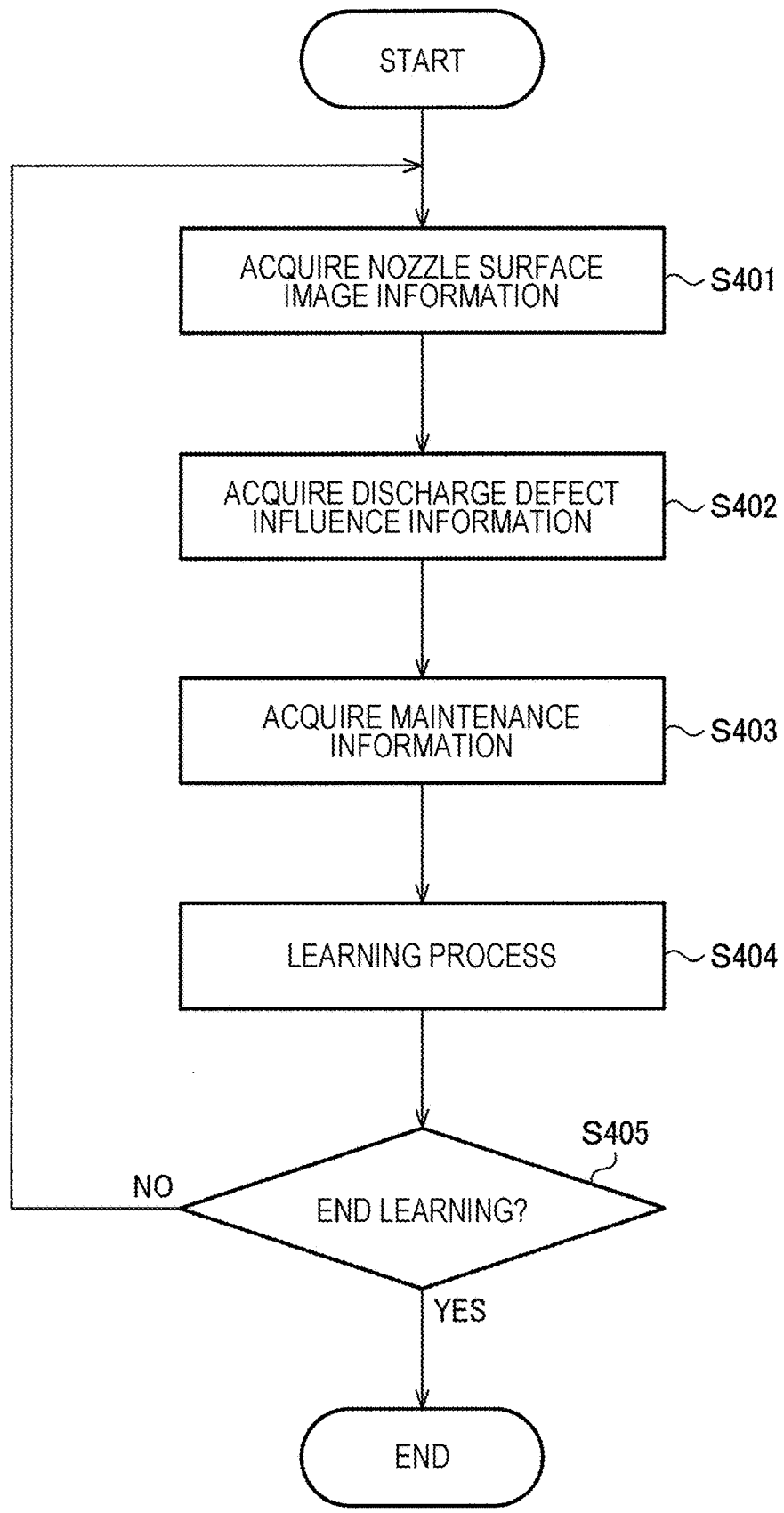
FIG. 19 is a flowchart illustrating the learning process.

FIG. 19 is a flowchart illustrating the learning process based on the training data. When the process is started, in step S401 to step S403, the acquisition portion 410 of the learning device 400 acquires one data set in which the nozzle surface image information, the discharge defect influence information, and the maintenance information are associated with each other. The one data set corresponds to one line of data in the training data of FIG. 18.

In step S404, the learning portion 420 executes a specific learning process. The learning portion 420 inputs the nozzle surface image information and the discharge defect influence information to the neural network, and obtains an output by performing the forward calculation using the weighting coefficient information at that time. The output is, for example, numerical data representing the recommended execution timing as described above.

The learning portion 420 obtains an error function based on the output and the maintenance information. The error function is, for example, the absolute difference values between the numerical values that are the outputs and the numerical values that are the maintenance information. However, the method for calculating the error function is not limited thereto, and various modifications can be performed. Further, in step S404, the learning portion 420 updates the weighting coefficient information so as to reduce the error function. In the process, the backpropagation method can be applied as described above.

Step S401 to step S404 are processes based on one data set. In step S405, the learning portion 420 determines whether or not to end the learning process. In a case of Yes in step S405, the learning portion 420 ends the learning process. The learning device 400 outputs the learned model, which is the learning result, to the information processing system 200. The information of the learned model is stored in the storage portion 230. In a case of No in step S405, the learning portion 420 returns to step S401 and continues the process.

In addition, the fact that the input of the neural network may be the nozzle surface image information itself or may be the defect factor information obtained from the nozzle surface image information is the same as the above-described example.

6.2 Inference Process

Figure 20:
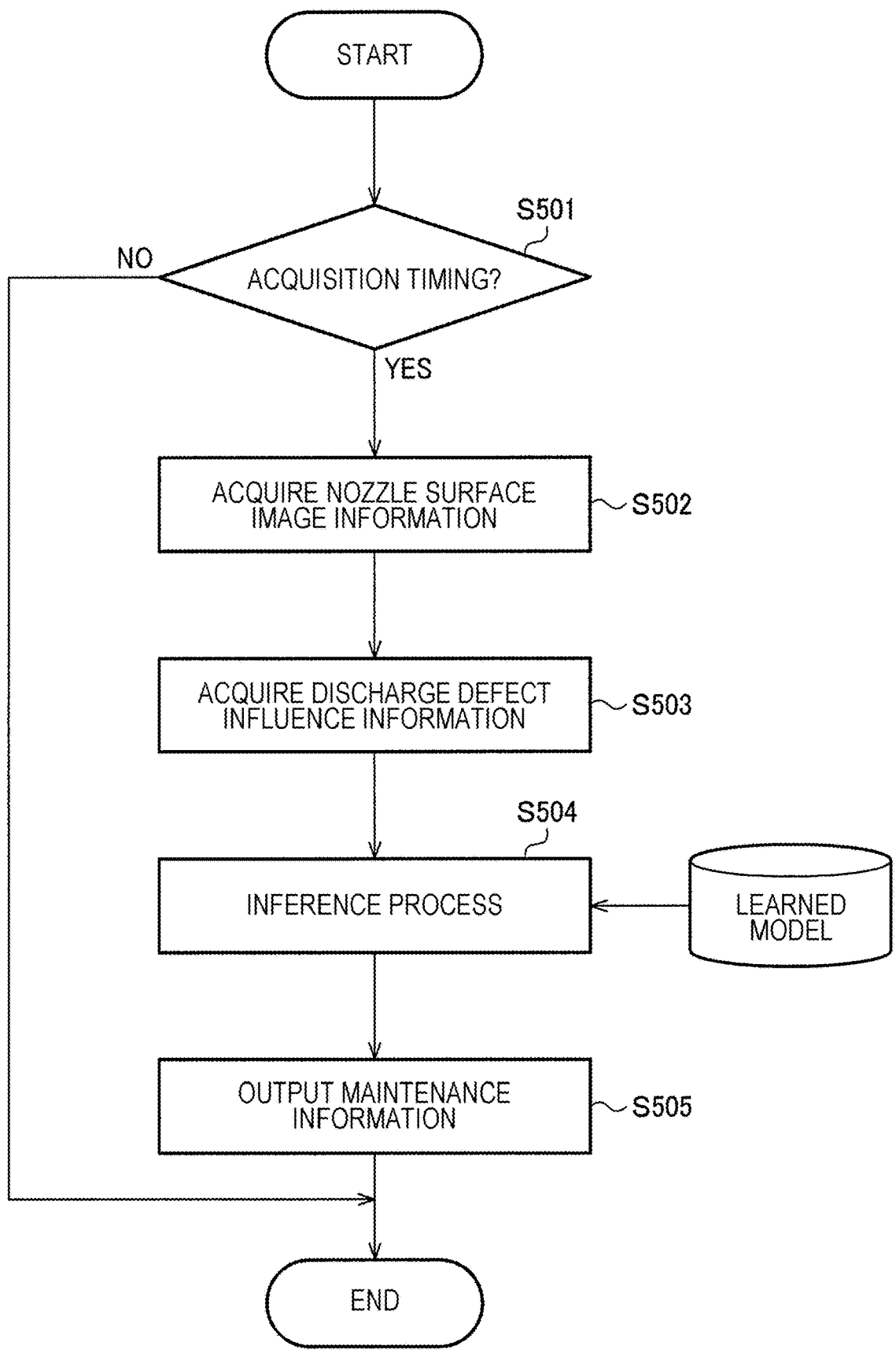
FIG. 20 is a flowchart illustrating the process of outputting the maintenance information.

FIG. 20 is a flowchart showing the inference process in the information processing system 200. When the process is started, first, in step S501, the processing portion 220 determines whether the current timing is the timing for obtaining the maintenance information, that is, the timing for acquiring nozzle surface image information.

For example, the acquisition portion 210 may acquire the nozzle surface image information at any timing of a print start timing, a print end timing, and an inter-job page timing. The inter-job page timing represents, for example, a timing after the end of a given page printing and before a next page printing when, for example, printing is performed in page units.

For example, the printing device 1 outputs control information representing a gist to the acquisition portion 210 of the information processing system 200 at any timing of a timing before starting the printing, a timing after ending the printing, and a timing at which a page is switched. When the control information is acquired, the processing portion 220 determines Yes in step S501 and executes processes in step S502 and subsequent steps. Alternatively, in step S501, the acquisition portion 210 may request the printing device 1 to acquire the control information.

When the process of obtaining the maintenance information is executed at the start of printing, it is possible to suppress the occurrence of discharge defect in the middle of printing. In addition, the printing operation is likely to change the state of the nozzle plate surface. Therefore, it is possible to efficiently suppress the occurrence of discharge defect by performing a process of outputting the maintenance information at the end of printing. Further, the inter-job page timing is a timing representing after the end of the given print unit and before the start of the next print unit when one print job is divided into finer print units. Therefore, when the process of obtaining the maintenance information is performed at the inter-job page timing, it is possible to suppress the occurrence of discharge defect in the middle of printing and to efficiently suppress the occurrence of discharge defect.

In a case of No in step S501, the processing portion 220 ends the process. In a case of Yes in step S501, in step S502 and step S503, the acquisition portion 210 acquires the nozzle surface image information and the discharge defect influence information from the printing device 1. Specifically, the acquisition portion 210 acquires the image information which is the output of the second imaging unit 75. Further, the acquisition portion 210 acquires the output of the detector group 90, the information input by the user, the control information related to printing, and the like as the discharge defect influence information.

In step S504, the processing portion 220 performs a process of determining the recommended execution timing of maintenance based on the learned model generated by the learning device 400 and the nozzle surface image information and the discharge defect influence information which are acquired in step S502 and step S503. Specifically, the processing portion 220 inputs the nozzle surface image information and the discharge defect influence information to the learned model read from the storage portion 230, and obtains the numerical data representing the recommended execution timing by performing the forward calculation.

In step S505, the processing portion 220 outputs the maintenance information. For example, the processing portion 220 transmits the recommended execution timing of maintenance to the printing device 1 as the maintenance information. The printing device 1 executes the maintenance sequence when reaching the recommended execution timing represented by the maintenance information.

As described above, the learned model may be machine-learned based on the data set in which the nozzle surface image information, the discharge defect influence information influencing the future discharge defect, and the maintenance information are associated with each other. The acquisition portion 210 acquires the nozzle surface image information and the discharge defect influence information, and the processing portion 220 outputs the maintenance information representing the recommended execution timing of maintenance based on the nozzle surface image information, the discharge defect influence information, and the learned model.

In this way, it is possible to estimate the recommended execution timing of maintenance based on the nozzle surface image information. Therefore, it is possible to flexibly set a maintenance execution timing in the printing device 1. At that time, when the discharge defect influence information useful to estimate the change in the adhesive foreign matter OB4 or the liquid droplet OB5 with time is used in addition to the nozzle surface image information, it is possible to output the highly accurate maintenance information.

In step S504, the processing portion 220 may obtain the defect factor information based on the nozzle surface image information, and may output the maintenance information based on the defect factor information and the discharge defect influence information.

In addition, hereinabove, as shown in FIG. 12 and FIG. 17, an example is described in which the necessity of maintenance is output when the discharge defect influence information is not input to the learned model and the recommended execution timing of maintenance is output when the discharge defect influence information is input to the learned model. However, the method of the present embodiment is not limited thereto. For example, the necessity of maintenance may be output when the discharge defect influence information is input to the learned model, and the recommended execution timing of maintenance is output when the discharge defect influence information is not input to the learned model.

7. Modification Example

Hereinafter, some modification examples will be described.

7.1 Determination of Maintenance Sequence

The maintenance information of the present embodiment may include information for specifying the maintenance sequence to be executed, in addition to the information for specifying the necessity of maintenance or the recommended execution timing. In this way, when maintenance is necessary, it is possible to propose a maintenance sequence that can appropriately eliminate the factor leading to the discharge defect.

The maintenance information at this time may be information which specifies the maintenance sequence including the wiping operation of the nozzle plate surface. The adhesive foreign matter OB4 shown in FIG. 7 or the liquid droplet OB5 shown in FIG. 8 is generated on the nozzle plate surface. The wiping operation is a maintenance operation that acts directly on the nozzle plate surface. Therefore, when the maintenance information for causing the printing device 1 to execute the maintenance sequence including the wiping operation is output, it is possible to appropriately suppress the occurrence of the future discharge defect. Here, the wiping operation may be the mopping operation or the pressing operation.

However, the maintenance sequence in the present embodiment is not limited to a configuration including only one wiping operation, and may include other maintenance operations. For example, the maintenance information may include information for specifying a maintenance sequence which includes at least one of the maintenance operation of the flushing operation and the minute suction operation of ink from the nozzle Nz, and the wiping operation.

A state of the meniscus of the nozzle Nz may become unstable due to the wiping operation. Therefore, when the flushing operation is performed after the wiping operation and the meniscus is adjusted, the printing stability can be improved. In addition, when the wiping operation is performed in a state in which the nozzle plate surface is not wet, the friction on the nozzle plate surface becomes large, so that there is a problem in that a water-repellent film on the nozzle plate surface is damaged. When the water-repellent film is damaged, the liquid droplet OB5 is likely to adhere to the water-repellent film, so that there is a high possibility that the future discharge defect will occur, so that it is necessary to replace the print head 30 in some cases. Therefore, it is effective to wet the nozzle plate surface with ink by performing the minute suction operation before the wiping operation. It is also possible to wet the nozzle plate surface with ink by the flushing operation.

When the wiping operation is combined with other maintenance operations in this way, it is possible to realize a more desirable maintenance sequence. When the combination is performed, the number and the order of the plurality of maintenance operations are not limited to those described above, and various modifications can be performed.

For example, in the learning stage, when the discharge defect occurs at the timing of $t_i$ in FIG. 13 and FIG. 18, the printing device 1 executes any maintenance sequence among a plurality of maintenance sequence candidates.

Further, it is determined whether or not the discharge defect is appropriately eliminated and whether or not the factor of the discharge defect is appropriately eliminated by the performed maintenance sequence. For example, in the printing device 1 at the learning stage, at least one of improvement state information of the factor of the discharge defect after maintenance and print stability information after maintenance is collected.

The improvement state information represents the state of the adhesive foreign matter OB4 or the liquid droplet OB5 on the nozzle plate surface. Specifically, when a degree of influence of the adhesive foreign matter OB4 or the liquid droplet OB5 on the nozzle Nz decreases, it is determined that the factor of the discharge defect has improved. For example, the degree of influence of the adhesive foreign matter OB4 or the liquid droplet OB5 on the nozzle Nz is determined to be smaller as the number is smaller, the size and ratio are smaller, and the distance from the nozzle Nz is longer. The improvement state information is acquired, for example, by comparing the pieces of nozzle surface image information which are acquired before and after the execution of the maintenance sequence.

Further, the print stability information is, for example, information representing a print amount and an elapsed time until the next discharge defect occurs after the discharge defect is eliminated by the execution of the maintenance sequence. It is considered that the larger the print amount or the longer the elapsed time, the more appropriately the factor of the discharge defect is removed by the executed maintenance sequence.

For example, it is assumed that the discharge defect is eliminated and the factor of the discharge defect is appropriately eliminated by executing the maintenance sequence. The discharge defect is eliminated in a case where it is determined that the discharge defect does not occur based on the discharge result information acquired after maintenance. The factor of the discharge defect is appropriately eliminated in a case where it is determined that the factor of the discharge defect is improved based on the improvement state information, in a case where it is determined that printing corresponding to a predetermined value or more is performed until the next discharge defect occurs based on the print stability information, or in both the cases.

In this case, the maintenance information includes information representing the necessity of maintenance or the recommended execution timing of the maintenance, and information for specifying the executed maintenance sequence. The learning device 400 acquires, as the training data, a data set in which the maintenance information and the nozzle surface image information are associated with each other. For example, it is assumed that, when a p-th maintenance sequence is executed in a first maintenance sequence to an N-th maintenance sequence, the discharge defect is eliminated and the factor of the discharge defect is appropriately eliminated. N is an integer of 2 or more, and p is an integer of 1 or more and N or less. The maintenance information in this case includes, for example, a set of N numerical values in which a value corresponding to the p-th maintenance sequence is 1 and values corresponding to the first to (p−1)-th maintenance sequences and (p+1)-th to N-th maintenance sequences are 0. When the same nozzle surface image information is acquired by using the training data, it is possible to perform learning in which the p-th maintenance sequence is likely to be selected.

Further, when the p-th maintenance sequence is executed but the discharge defect is not eliminated or when the discharge defect is eliminated but the factor of the discharge defect is not properly removed, the learning device 400 may perform the learning so that the p-th maintenance sequence is hardly selected. The maintenance information in this case includes, for example, a set of N numerical values in which a value corresponding to the p-th maintenance sequence is 0 and values corresponding to the first to (p−1)-th maintenance sequences and (p+1)-th to N-th maintenance sequences becomes uniform. In addition, a value of the correct answer label corresponding to the p-th maintenance sequence is not limited to 0 or 1, and an intermediate value between 0 and 1 may be set according to the improvement state information and the print stability information.

In the inference process, the processing portion 220 obtains two numerical data representing the necessity of maintenance and N numerical data recommending each of the first to N-th maintenance sequences based on the nozzle surface image information and the learned model. When it is determined that maintenance is necessary, the processing portion 220 outputs the maintenance information representing any one maintenance sequence of the first to N-th maintenance sequences based on the maximum value of the N numerical data.

Alternatively, the processing portion 220 obtains numerical data representing the recommended execution timing of maintenance and N numerical data recommending each of the first to N-th maintenance sequences based on the nozzle surface image information and the learned model. The processing portion 220 outputs the maintenance information representing the recommended execution timing and any one maintenance sequence of the first to N-th maintenance sequences.

7.2 Modification Example of Input Information

Hereinabove, an example, in which the learned model is generated based on the data set in which the nozzle surface image information and the maintenance information are associated with each other, is described. The processing portion 220 outputs the maintenance information based on the learned model and the nozzle surface image information. However, the data set may include further information.

For example, the learned model of the present embodiment may be machine-learned based on a data set in which the nozzle surface image information, the maintenance information, and maintenance history information representing history of maintenance performed on the print head 30 are associated with each other.

Here, the maintenance history information is information which specifies one or more maintenance sequences executed in the past. In addition, the maintenance history information may include information such as an execution timing of the maintenance sequence in the past and the number of executions. For example, even when the state of the nozzle plate surface is the same, it is considered that the characteristic relating to the adhesive foreign matter OB4 or the liquid droplet OB5 is different between the printing device 1 in which the wiping operation is performed many times before and the printing device 1 in which the wiping operation is not performed many times. For example, when the wiping operation is repeated, there is a possibility that the water-repellent film on the nozzle plate surface is damaged, so that a state of the adhesive foreign matter OB4 or the liquid droplet OB5 is likely to deteriorate. When the maintenance history information is used, it is possible to perform a process in consideration of the usage history of the printing device 1, so that it is possible to improve an estimation accuracy of the maintenance information.

For example, the learning device 400 generates the learned model by performing the machine learning using the nozzle surface image information and the maintenance history information as input data and using the maintenance information as the correct answer label. The processing portion 220 outputs the maintenance information by acquiring the nozzle surface image information and the maintenance history information of the target printing device 1 and inputting the information to the learned model.

In addition, the learned model may be machine-learned based on a data set in which the nozzle surface image information, the discharge result information including the amount of deviation of an ink discharge position, and the maintenance information are associated with each other. The ink discharge position represents, for example, a position when the ink droplet discharged from the nozzle Nz lands on the print medium.

Here, the discharge result information is information acquired, for example, by imaging the print medium using the imaging portion included in the printing device 1. In the example shown in FIG. 2, the imaging portion here is the first imaging portion 71 included in the first imaging unit 70. In this way, it is possible to automatically detect the discharge result by the print head 30. For example, the printing device 1 prints a given test pattern. The processing portion 220 can determine whether or not the ink droplets land at a desired position by comparing test pattern information with the discharge result information which is an actual printing result.

It is possible to use the discharge result information to detect the occurrence of discharge defect as described above. However, it is considered that it is possible to use the discharge result information to detect a change in the discharge result to the extent that it is not determined to be the discharge defect. In other words, the discharge result information is information including a sign of the future discharge defect. Therefore, when the discharge result information is used, it is possible to improve the estimation accuracy of maintenance information.

For example, the learning device 400 generates the learned model by performing the machine learning using the nozzle surface image information and the discharge result information as the input data and the maintenance information as the correct answer label. The processing portion 220 outputs the maintenance information by acquiring the nozzle surface image information and the discharge result information and inputting the nozzle surface image information and the discharge result information to the learned model.

Here, the discharge result information may be information acquired by imaging the print medium using the imaging portion attached to the carriage 21 on which the print head 30 is mounted. For example, as described above with reference to FIG. 6, the first imaging portion 71, which is the imaging portion here, may be attached to the carriage 21 on which the print head 30 is mounted. In this way, it is possible to vary a relative positional relationship between the first imaging portion 71 and the print medium in accordance with the movement of the carriage 21. Therefore, for example, even when an angle of view of the first imaging portion 71 is narrow, it is possible to image a wide range of the print medium by a plurality of times of imaging.

In addition, in the present embodiment, the nozzle surface image information at a given one timing may be used for processing, but the present embodiment is not limited thereto. For example, the learned model may be machine-learned based on a data set in which a plurality of pieces of nozzle surface image information at a plurality of timings are associated with the maintenance information.

For example, in the learning stage, first nozzle surface image information and second nozzle surface image information at a timing later than the first nozzle surface image information are acquired. For example, when the timing of $t_2$ in FIG. 13 is used as a reference, the first nozzle surface image information corresponds to IM1 and the second nozzle surface image information corresponds to IM2. The input data is, for example, a difference between the number of adhesive foreign matters OB4 and liquid droplets OB5 obtained from IM2 and the number of adhesive foreign matters OB4 and liquid droplets OB5 obtained from IM1. Here, specifically, the difference is information representing a deterioration speed of the state of the adhesive foreign matter OB4 or the liquid droplet OB5. In addition, although an example in which the number of adhesive foreign matters OB4 and liquid droplets OB5 is used as the defect factor information is shown here, information representing the deterioration speed using the size, the ratio, the distance distribution, and the like may be obtained.

For example, the learning device 400 generates the learned model by performing the machine learning using information representing the deterioration speed obtained from a plurality of pieces of nozzle surface image information as input data and the maintenance information as the correct answer label. The processing portion 220 outputs the maintenance information by obtaining the information representing the deterioration speed from a plurality of pieces of nozzle surface image information and inputting the obtained information to the learned model.

In addition, a plurality of pieces of nozzle surface image information may be used as they are, instead of performing the process of obtaining the information representing the deterioration speed. For example, the learning device 400 generates the learned model by performing the machine learning using time-series image data including a plurality of pieces of nozzle surface image information as the input data and the maintenance information as the correct answer label. The processing portion 220 outputs the maintenance information by inputting the time-series image data including a plurality of pieces of nozzle surface image information to the learned model.

7.3 Feedback

Further, feedback may be performed by observing a result executed in the printing device 1 based on the maintenance information output by the information processing system 200. For example, it is assumed that the information processing system 200 outputs the maintenance information representing that maintenance is not necessary based on the given nozzle surface image information and the learned model, the printing device 1 does not execute the maintenance sequence, and, as a result, the discharge defect occurs until next maintenance information is output. In this case, it is considered that it is desirable to determine that maintenance is necessary at the timing in which the nozzle surface image information is acquired. Therefore, the learning portion 420 of the learning device 400 performs a process of updating the weighting coefficient information of the neural network based on the data set in which the nozzle surface image information and the maintenance information representing that maintenance is necessary are associated with each other.

In addition, it is assumed that, although the information processing system 200 outputs the maintenance information, in which a timing after a given period T1 elapses is set as the recommended execution timing, based on the given nozzle surface image information and the learned model, the discharge defect occurs in the printing device 1 at a time point after T2 elapses. T1 and T2 are positive numbers that satisfy T2<T1, respectively. In this case, it is considered that it is desirable to determine that maintenance is necessary before T2 elapses at the timing in which the nozzle surface image information is acquired. Therefore, the learning portion 420 of the learning device 400 performs a process of updating the weighting coefficient information of the neural network based on the data set in which the nozzle surface image information and the maintenance information in which a timing after T3 elapses is used as the recommended execution timing are associated with each other. T3 is a positive number that satisfies T3<T2. In addition, it is possible to perform various modifications on a method of feeding back the result in the printing device 1.

A learned model updating process may be performed for each printing device 1. For example, the learning device 400 may perform a separate updating process for each printing device 1. Alternatively, the printing device 1 may include the learning device 400. As described above, the characteristic related to the factor of the discharge defect differs depending on the configuration and usage environment of the printing device 1. When the updating process is performed for each printing device 1, it is possible to generate a learned model specialized for the target printing device 1.

As described above, an information processing system of the present embodiment includes a storage portion that stores a learned model, an acquisition portion that acquires nozzle surface image information, and a processing portion that outputs maintenance information based on the nozzle surface image information and the learned model at a timing before a discharge defect of a print head occurs. The learned model is a model obtained by performing machine learning on a maintenance condition for the print head based on a data set in which the nozzle surface image information obtained by photographing a nozzle plate surface of the print head and the maintenance information representing necessity of maintenance of the print head or a recommended execution timing of maintenance are associated with each other.

According to the method of the present embodiment, the maintenance information of the print head is output based on the nozzle surface image information. Since the information representing a state of the nozzle plate surface is used, it is possible to detect a sign of the discharge defect in a state before the discharge defect occurs. As a result, it is possible to promote maintenance at a timing in which it is possible to suppress the discharge defect and it is possible to suppress the excessive maintenance.

Further, in the present embodiment, the maintenance information may include information for specifying a maintenance sequence including a wiping operation of the nozzle plate surface.

In this way, it is possible to determine not only the necessity of maintenance or the recommended execution timing, but also the maintenance sequence desirable for suppressing the discharge defect.

Further, in the present embodiment, the maintenance information may include information for specifying the maintenance sequence including at least one of maintenance operation of a flushing operation and a minute suction operation of ink from a nozzle, and the wiping operation.

In this way, it is possible to present various maintenance sequences.

Further, in the present embodiment, the processing portion may determine an acquisition timing of the nozzle surface image information based on discharge defect influence information which influences a future discharge defect.

In this way, it is possible to output the maintenance information at an appropriate timing in consideration of the future discharge defect.

Further, in the present embodiment, the processing portion may output the maintenance information representing the necessity of maintenance at the acquisition timing based on the nozzle surface image information, which is acquired at the acquisition timing, and the learned model.

In this way, it is possible to determine the necessity of maintenance at the appropriate timing, so that it is possible to appropriately suppress the occurrence of discharge defect.

Further, in the present embodiment, the learned model may be machine-learned based on the data set in which the nozzle surface image information, the discharge defect influence information influencing the future discharge defect, and the maintenance information are associated with each other. The acquisition portion acquires the nozzle surface image information and the discharge defect influence information. The processing portion outputs the maintenance information representing the recommended execution timing of maintenance based on the nozzle surface image information, the discharge defect influence information, and the learned model.

In this way, since it is possible to use the machine learning in consideration of the future discharge defect and the learning result, it is possible to output highly accurate maintenance information.

Further, in the present embodiment, the discharge defect influence information includes at least one information of dust fluff amount information in a printing device or on a print medium, print medium type information, temperature information, humidity information, and print condition information.

In this way, when a process is performed in consideration of the dust fluff amount, the temperature, the humidity, the type of print medium, the printing condition, and the like, which influence the future discharge defect, it is possible to output highly accurate maintenance information.

Further, in the present embodiment, the nozzle surface image information may be information specifying at least one of the foreign matter information related to the foreign matter on the nozzle plate surface and the liquid droplet information related to the liquid droplets on the nozzle plate surface.

In this way, it is possible to perform a process in consideration of the foreign matter or the liquid droplet on the nozzle plate surface, which may be a factor of the discharge defect, so that it is possible to output highly accurate maintenance information.

Further, in the present embodiment, the processing portion may obtain defect factor information related to at least one of the number of foreign matters or liquid droplets, a size or a ratio of the foreign matters or the liquid droplets, and a distance distribution of the foreign matters or the liquid droplets from a nozzle hole based on the nozzle surface image information, and may output the maintenance information based on the defect factor information and the learned model.

In this way, it is possible to perform a process in consideration of a specific state of the foreign matter or the liquid droplets.

Further, in the present embodiment, the acquisition portion may acquire the nozzle surface image information at any timing of a print start timing, a print end timing, and an inter-job page timing.

In this way, it is possible to output the maintenance information at an appropriate timing.

Further, in the present embodiment, the learned model may be machine-learned based on a data set in which the nozzle surface image information, maintenance history information, and the maintenance information are associated with each other.

In this way, when a maintenance history in the past is used for the process, it is possible to output more appropriate maintenance information.

Further, in the present embodiment, the learned model may be machined-learned based on a data set in which the nozzle surface image information, the discharge result information including an amount of deviation of an ink discharge position, and the maintenance information are associated with each other.

In this way, when an actual discharge result is used in the printing device for processing, it is possible to output more appropriate maintenance information.

Further, in the present embodiment, the discharge result information may be information acquired by imaging a print medium using an imaging portion attached to a carriage on which the print head is mounted.

In this way, it is possible to efficiently image the print medium by the imaging portion.

Further, a learning device of the present embodiment includes an acquisition portion and a learning portion. The acquisition portion acquires a data set in which nozzle surface image information obtained by photographing a nozzle plate surface of a print head and maintenance information representing necessity of maintenance of the print head or a recommended execution timing of maintenance are associated with each other. The learning portion generates a learned model by performing machine learning on a maintenance condition for the print head for executing the maintenance at a timing before a discharge defect of the print head occurs based on the data set.

Further, an information processing method of the present embodiment includes acquiring a learned model, acquiring nozzle surface image information, and outputting, at a timing before discharge defect of the print head occurs, maintenance information based on the nozzle surface image information and the learned model. The learned model is a model obtained by performing machine learning on a maintenance condition for the print head based on a data set in which the nozzle surface image information obtained by photographing a nozzle plate surface of the print head and the maintenance information representing necessity of maintenance of the print head or a recommended execution timing of maintenance are associated with each other.

Although the present embodiment is described in detail as described above, those skilled in the art can easily understand that many modifications that do not substantially deviate from new matters and effects of the present embodiment are possible. Therefore, all such modification examples are included in the scope of the present disclosure. For example, a term, which is described at least once in a specification or a drawing together with a different term in a broader or synonymous manner, can be replaced by the different term anywhere in the specification or the drawing. All combinations of the present embodiment and modification examples are also included in the scope of the present disclosure. Further, the configuration and the operation of the information processing system, the printing device, and the like are not limited to those described in the present embodiment, and various modifications can be performed.

What is claimed is:

1. An information processing system comprising:
   a storage portion that stores a learned model obtained by performing machine learning on a maintenance condition for a print head based on a first data set and a second data set,
   the first data set in which first nozzle surface image information obtained by photographing a nozzle plate surface of the print head at a first timing and maintenance information representing necessity of maintenance of the print head or a recommended execution timing of the maintenance are associated with each other,
   the second data set in which second nozzle surface image information obtained by photographing the nozzle plate surface of the print head at a second timing and the maintenance information are associated with each other, and
   the second timing is closer to a timing at which discharge defect of the print head occurred than the first timing;
   an acquisition portion that acquires current nozzle surface image information obtained by photographing the nozzle plate surface of the print head at a current timing; and
   a processing portion that determines an acquisition timing of the current nozzle surface image information based on discharge defect influence information, which influences a future discharge defect, and outputs the maintenance information based on the current nozzle surface image information, the discharge defect influence information, and the learned model, before the discharge defect of the print head occurs, wherein
   the acquisition timing is shorter when the discharge defect influence information satisfies a condition than when the discharge defect influence information does not satisfy the condition.

2. The information processing system according to claim 1, wherein
   the maintenance information includes information specifying a maintenance sequence including a wiping operation of the nozzle plate surface.

3. The information processing system according to claim 2, wherein
   the maintenance information includes information specifying the maintenance sequence including at least one maintenance operation of a flushing operation and a minute suction operation of ink from a nozzle, and the wiping operation.

4. The information processing system according to claim 1, wherein
   the processing portion outputs the maintenance information representing the necessity of the maintenance at the acquisition timing based on the current nozzle surface image information, which is acquired at the acquisition timing, and the learned model.

5. The information processing system according to claim 1, wherein
   the learned model is machine-learned based on a data set in which the nozzle surface image information, discharge defect influence information which influences a future discharge defect, and the maintenance information are associated with each other,
   the acquisition portion acquires the nozzle surface image information and the discharge defect influence information, and
   the processing portion outputs the maintenance information representing the recommended execution timing of the maintenance based on the nozzle surface image information, the discharge defect influence information, and the learned model.

6. The information processing system according to claim 1, wherein
   the discharge defect influence information includes at least one information of dust fluff amount information in a printing device or on a print medium, print medium type information, temperature information, humidity information, and print condition information.

7. The information processing system according to claim 1, wherein
   the first nozzle surface image information, the second nozzle surface image information, and the current nozzle surface image information are information for specifying at least one of foreign matter information related to a foreign matter on the nozzle plate surface and liquid droplet information related to a liquid droplet on the nozzle plate surface.

8. The information processing system according to claim 7, wherein
   the processing portion obtains defect factor information related to at least one of the number of the foreign matters or the liquid droplets, a size or a ratio of the foreign matters or the liquid droplets, and a distance distribution of the foreign matters or the liquid droplets from a nozzle hole based on the current nozzle surface image information, and
   outputs the maintenance information based on the defect factor information and the learned model.

9. The information processing system according to claim 1, wherein
   the acquisition portion acquires the current nozzle surface image information at any timing of a print start timing, a print end timing, and an inter-job page timing.

10. The information processing system according to claim 1, wherein
    the learned model is machine-learned based on the first data set in which the first nozzle surface image information, maintenance history information, and the maintenance information are associated with each other.

11. The information processing system according to claim 1, wherein
the learned model is machine-learned based on the first data set in which the first nozzle surface image information, discharge result information including an amount of deviation of an ink discharge position, and the maintenance information are associated with each other.

12. The information processing system according to claim 11, wherein
the discharge result information is information acquired by imaging a print medium using an imaging portion attached to a carriage on which the print head is mounted.

13. An information processing method comprising:
acquiring a learned model obtained by performing machine learning on a maintenance condition for a print head based on a first data set, in which first nozzle surface image information obtained by photographing a nozzle plate surface of the print head at a first timing and maintenance information representing necessity of maintenance of the print head or a recommended execution timing of the maintenance are associated with each other, and a second data set, in which second nozzle surface image information obtained by photographing the nozzle plate surface of the print head at a second timing and the maintenance information are associated with each other, wherein the second timing is closer to a timing at which discharge defect of the print head occurred than the first timing;
acquiring current nozzle surface image information obtained by photographing the nozzle plate surface of the print head at a current timing;
determining an acquisition timing of the current nozzle surface image information based on discharge defect influence information, which influences a future discharge defect, and;
outputting the maintenance information based on the current nozzle surface image information and the learned model before the discharge defect of the print head occurs, wherein
the acquisition timing is shorter when the discharge defect influence information satisfies a condition than when the discharge defect influence information does not satisfy the condition.

* * * * *